(12) United States Patent
Kobayashi et al.

(10) Patent No.: US 7,800,986 B2
(45) Date of Patent: Sep. 21, 2010

(54) OPTICAL PICKUP AND OPTICAL DISC APPARATUS

(75) Inventors: Takashi Kobayashi, Kanagawa (JP); Katsuhiro Seo, Kanagawa (JP); Yoshiki Okamoto, Kanagawa (JP); Noriyuki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 876 days.

(21) Appl. No.: 11/678,395

(22) Filed: Feb. 23, 2007

(65) Prior Publication Data
US 2007/0206451 A1 Sep. 6, 2007

(30) Foreign Application Priority Data
Mar. 3, 2006 (JP) ............................. 2006-057690
Dec. 6, 2006 (JP) ............................. 2006-329755

(51) Int. Cl.
*G11B 7/00* (2006.01)
(52) U.S. Cl. .................. 369/44.24; 369/44.42; 369/118
(58) Field of Classification Search ............. 369/44.27, 369/44.28, 44.32, 44.25, 44.26, 112.1, 112.01, 369/112.02, 44.23, 44.24, 120, 44.41, 44.42, 369/118
See application file for complete search history.

(56) References Cited

U.S. PATENT DOCUMENTS

| | | | | |
|---|---|---|---|---|
| 4,334,300 A | * | 6/1982 | Arquie et al. | 369/44.12 |
| 5,875,159 A | * | 2/1999 | Doi | 369/44.24 |
| 6,438,091 B2 | * | 8/2002 | Nagata et al. | 369/118 |
| 2005/0199778 A1 | | 9/2005 | Kadowaki et al. | |

FOREIGN PATENT DOCUMENTS

JP 2004-281026 10/2004

* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

An optical pickup for recording or reproducing an information signal in an optical disc includes a light source for emitting a light beam toward the optical disc, an objective lens for focusing the light beam emitted from the light source onto a recording surface of the optical disc, and a photodetector for receiving the light beam reflected by the recording surface of the optical disc and outputting a signal corresponding to an intensity of the received light beam. A spot of the light beam received by the photodetector is asymmetric in both a radial direction and a tangential direction of the optical disc. A lens shift signal for the objective lens is detected by a controller on the basis of the signal output from the photodetector, the controller controlling the objective lens to follow the optical disc.

16 Claims, 19 Drawing Sheets

OPTICAL PICKUP AND OPTICAL DISC APPARATUS

CROSS REFERENCES TO RELATED APPLICATIONS

The present invention contains subject matter related to Japanese Patent Application JP 2006-057690 filed in the Japanese Patent Office on Mar. 3, 2006 and Japanese Patent Application JP 2006-329755 filed in the Japanese Patent Office on Dec. 6, 2006, the entire contents of which are incorporated herein by reference.

BACKGROUND OF THE INVENTION

1. Field of the Invention

The present invention relates to an optical pickup and an optical disc apparatus, and more particularly, to an optical pickup and an optical disc apparatus in which servo control can be stably exerted with a simple configuration.

2. Description of the Related Art

In recent years, high-density and large-capacity optical discs, such as DVDs (Digital Versatile Discs), have been put in practical use and popularized as information storage media capable of storing large volumes of information such as moving pictures.

In optical pickups of known optical disc apparatuses that record or read information on optical discs, a light beam is applied onto an optical disc, and is reflected by an information recording surface of the optical disc. The reflected light beam is received by a photodetector having a plurality of regions, and a tracking error signal is detected by, for example, a push-pull method on the basis of signals output from the photodetector corresponding to the light received by the regions.

However, in the push-pull method using only one beam, detection error of the tracking error signal is sometimes caused by lens shifting.

Accordingly, various techniques of reducing the detection error of the tracking error signal have been proposed. In a so-called differential push-pull method as an example, a main beam and two sub-beams are shifted from one another by a preset amount along a direction orthogonal to tracks. A tracking error signal obtained from the main beam serves as a first push-pull signal, and a tracking error signal obtained from the two sub-beams serves as a second push-pull signal. A tracking error signal is obtained by subjecting the first and second push-pull signals to differential operation.

That is, according to the differential push-pull method, the influence of lens shifting is cancelled, and a tracking error signal can be detected precisely.

Japanese Unexamined Patent Application Publication No. 2004-281026 discloses another technique. In this technique, a part of a light beam that is not diffracted by a track structure of an optical recording medium is divided in two (or four) in the radial direction of the optical recording medium, and the light beam is diffracted by a diffraction grating, and is guided to a photodetector. By detecting the difference in the light intensity in the radial direction, shifting of an objective lens is detected.

SUMMARY OF THE INVENTION

However, since the main beam and the sub-beams are produced by using the diffraction grating in the above-described related art, the light utilization efficiency is reduced. Therefore, it is necessary to increase the intensity of the light emitted from the light source, and to change the configuration of the optical pickup for that purpose.

For precise detection of lens shifting, the positions of the sub-beams needs to be adjusted so that a push-pull signal obtained from the sub-beams has a phase opposite to that of the main beam. In order to prevent phase shifting of the push-pull signal of the sub-beams between the inner periphery and the outer periphery of the optical disc, the distances between the main beam and the sub-beams are not increased. For example, when information is recorded on or read from a multilayer recording medium (optical disc), the characteristic of a tracking error signal may be worsened by stray light from other layers.

In the technique disclosed in the above-described publication, the slit pitch of the diffraction grating needs to be small in order to completely separate diffracted light from non-diffracted light (0-order light) without any influence of stray light from other layers during recording and reproduction of the multilayer optical recording medium. This makes machining and positioning of the diffraction grating difficult. Moreover, when the interlayer distance is small (e.g., in a four-layer optical recording medium or an eight-layer optical recording medium), the influence of stray light from the other layers on the diffracted light itself occurs, and this may cause error in the tracking error signal.

In addition, the number of photodetectors, the scale of the circuit for signal output, and the power consumption are increased.

Accordingly, it is desirable to stably exert servo control with a simple configuration.

According to a first embodiment of the present invention, there is provided an optical pickup for recording or reproducing an information signal in an optical disc. The optical pickup includes a light source for emitting a light beam toward the optical disc; an objective lens for focusing the light beam emitted from the light source onto a recording surface of the optical disc; and a photodetector for receiving the light beam reflected by the recording surface of the optical disc and outputting a signal corresponding to an intensity of the received light beam. A spot of the light beam received by the photodetector is asymmetric in both a radial direction and a tangential direction of the optical disc. A lens shift signal for the objective lens is detected by a controller on the basis of the signal output from the photodetector, the controller controlling the objective lens to follow the optical disc.

According to the first embodiment of the present invention, a light beam is emitted from a light source toward an optical disc, is focused on to a recording surface of the optical disc, is reflected by the recording surface, and is then received by the photodetector. A signal corresponding to the intensity of the received light beam is output from the photodetector. A spot of the received light beam is asymmetric in both a radial direction and a tangential direction of the optical disc. A lens shift signal for the objective lens is detected by a controller, which controls the objective lens to follow the optical disc, on the basis of the signal output from the photodetector.

According to a second embodiment of the present invention, there is provided an optical disc apparatus that records or reproduces an information signal in an optical disc. The optical disc apparatus includes a light source for emitting a light beam toward the optical disc; an objective lens for focusing the light beam emitted from the light source onto a recording surface of the optical disc; a photodetector for receiving the light beam reflected by the recording surface of the optical disc and outputting a signal corresponding to an intensity a spot of the received light beam, and a controller for controlling the objective lens to follow the optical disc by detecting a lens shift signal for the objective lens on the basis of the signal output from the photodetector. The spot of the light beam received by the photodetector is asymmetric in both a radial direction and a tangential direction of the optical disc.

According to the second embodiment, a light beam is emitted toward an optical disc, is focused on to a recording surface of the optical disc, is reflected by the recording surface, and is then received. A signal corresponding to the intensity of a spot of the received light beam is output. The spot of the received light beam is asymmetric in both a radial direction and a tangential direction of the optical disc. A lens shift signal for the objective lens is detected on the basis of the signal output corresponding to the spot, and tracking of the optical disc is controlled on the basis of the lens shift signal.

According to the embodiments of the present invention, stable servo control can be exerted with a simple configuration.

DESCRIPTION OF THE PREFERRED EMBODIMENTS

Embodiments of the present invention will be described below. Examples of correspondences between elements of the invention and embodiments described in the specification or the drawings are as follows. This description is to confirm that embodiments for supporting the invention are described in the specification or drawings. Therefore, even when an embodiment described in the specification or the drawings is not described here as corresponding to the elements of the invention, this does not mean that the embodiment does not correspond to the elements. Conversely, even when an embodiment is described here as corresponding to the elements, this does not mean that the embodiment correspond only to the elements.

An optical pickup according to a first embodiment of the present invention records or reproduces an information signal in an optical disc (e.g., an optical recording medium 101 in FIG. 2), and includes a light source (e.g., a light-emitting element 121 in FIG. 2) for emitting a light beam toward the optical disc; an objective lens (e.g., an objective lens 125 in FIG. 2) for focusing the light beam emitted from the light source onto a recording surface of the optical disc; and a photodetector (e.g., a photodetector 127 in FIG. 2) for receiving the light beam reflected by the recording surface of the optical disc and outputting a signal corresponding to an intensity of the received light beam. A spot of the light beam received by the photodetector is asymmetric in both a radial direction and a tangential direction of the optical disc. A lens shift signal for the objective lens is detected on the basis of the signal output from the photodetector by a controller for controlling the objective lens to follow the optical disc.

Figure 5:
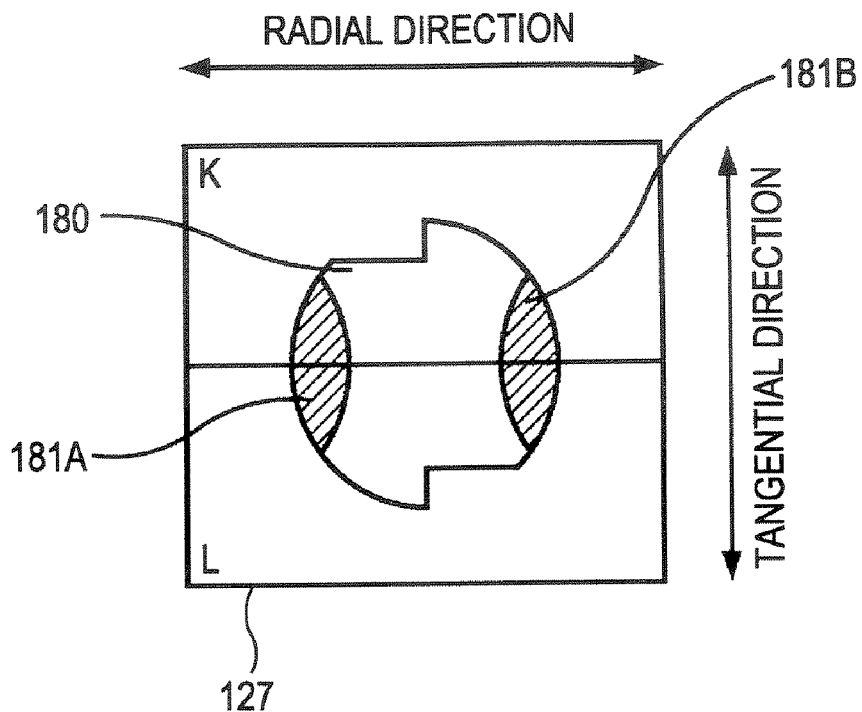
FIG. 5 is an explanatory view of a light-receiving section of a photodetector shown in FIG. 2.

In the optical pickup, the photodetector has a light-receiving section including a plurality of rectangular regions that are arranged in the tangential direction of the optical disc (e.g., arranged as shown in FIG. 5), and the lens shift signal is detected by a predetermined calculating operation of signals output from the photodetector corresponding to intensities of components of the light beam received by the regions.

Figure 11:
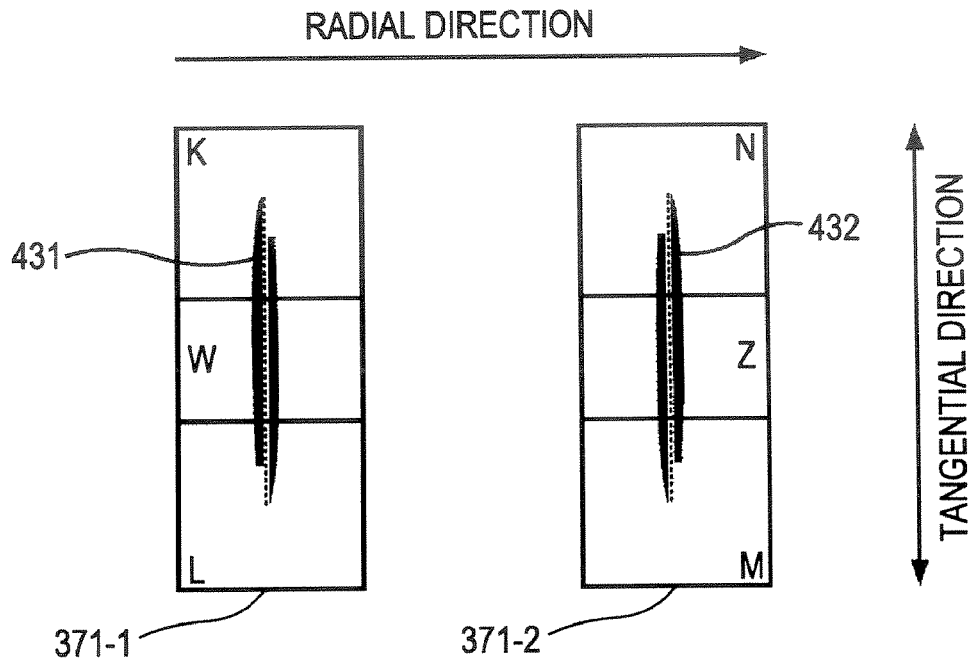
FIG. 11 is an explanatory view of a light-receiving section of a photodetector shown in FIG. 9.

The regions of the light-receiving section include at least three regions arranged in the tangential direction of the optical disc (e.g., arranged as shown in FIG. 11), and a focus error signal is detected by another predetermined calculating operation of signals output corresponding to intensities of components of the light beam received by the at least three regions.

The optical pickup further includes a shielding plate (e.g., a shielding plate 126 in FIG. 2) disposed in an optical path along which the light beam travels from the optical disc toward the photodetector. The shielding plate blocks a part of the light beam so that the spot of the light beam is asymmetric in the radial and tangential directions of the optical disc.

The optical pickup further includes a diffraction grating (e.g., a diffraction grating 381 in FIG. 9) disposed in an optical path along which the light beam travels from the optical disc toward the photodetector. The shielding plate diffracts a first part of the light beam so that the spot of the light beam is asymmetric in the radial and tangential directions of the optical disc.

Figure 30:
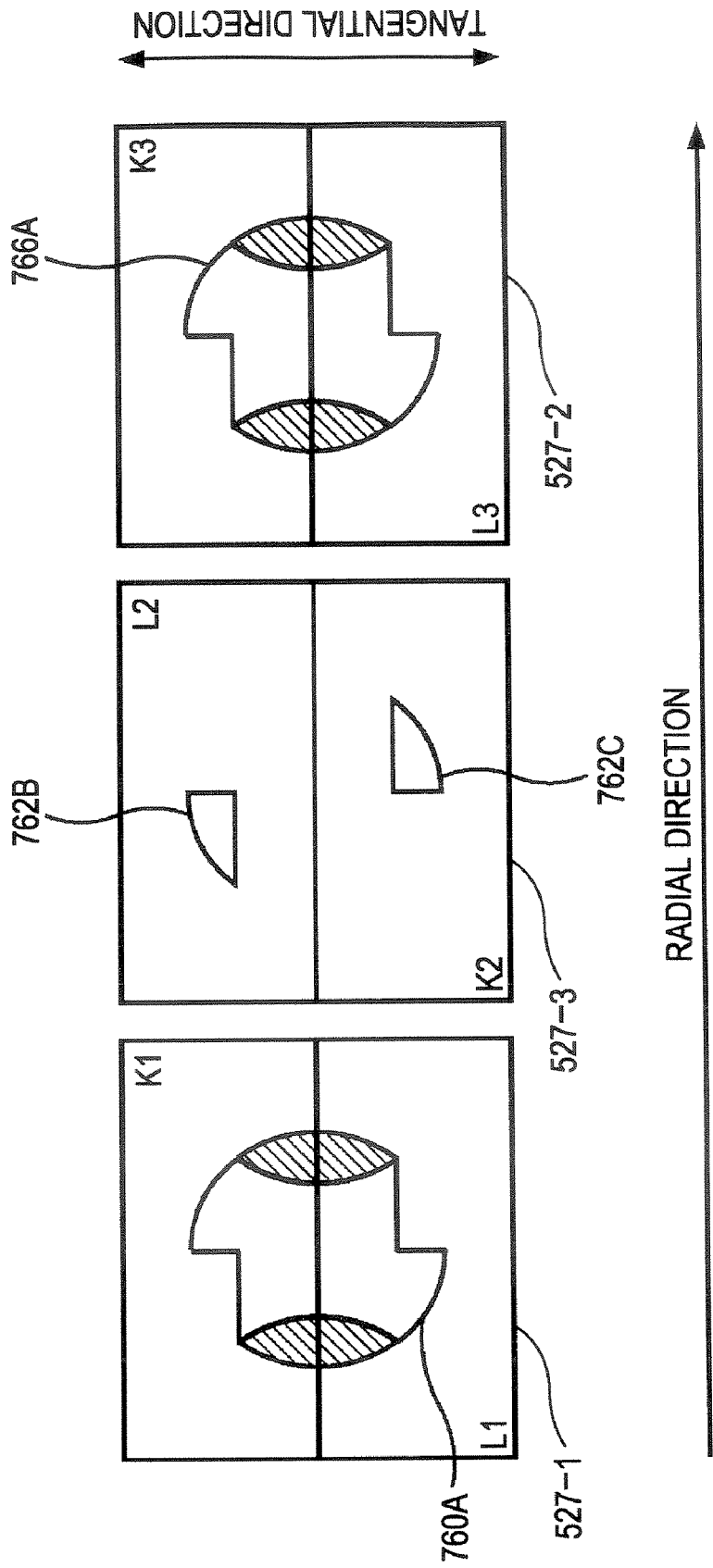
FIG. 30 is a structural view of a light-receiving section of a photodetector provided corresponding to the diffraction grating shown in FIG. 29.

In the optical pickup, a second part of the light beam is not diffracted by the diffraction grating, and is also received by the photodetector along with the first part of the light beam diffracted by the diffraction grating (e.g., received as shown in FIG. 30), and the lens shift signal is detected on the basis of signals corresponding to intensities of the first and second parts received by the photodetector.

The diffraction grating has at least two regions (e.g., diffraction gratings shown in FIGS. 21, 22, and 27) for diffracting the first part of the light beam so that the spot of the light beam is asymmetric in the radial and tangential directions of the optical disc. The photodetector receives components of the first part of the light beam diffracted by the at least two regions, and the lens shift signal is detected on the basis of signals corresponding to intensities of the components of the first part of the light beam.

Figure 8:
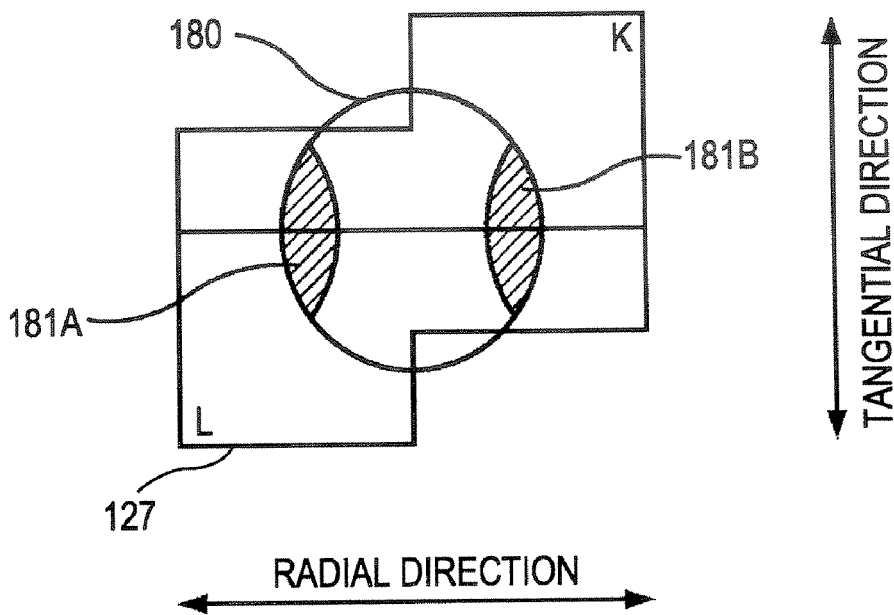
FIG. 8 is an explanatory view of another modification of the light-receiving section of the photodetector shown in FIG. 2.

The photodetector has a light-receiving section that receives the light beam and is asymmetric in the radial and tangential directions of the optical disc (e.g., shaped as shown in FIG. 8).

The light-receiving section includes at least two regions (e.g., a light-receiving section shown in FIG. 20) that are asymmetric in the radial and tangential directions of the optical disc, and the lens shift signal is detected on the basis of signals corresponding to intensities of components of the light beam received by the at least two regions.

Figure 7:
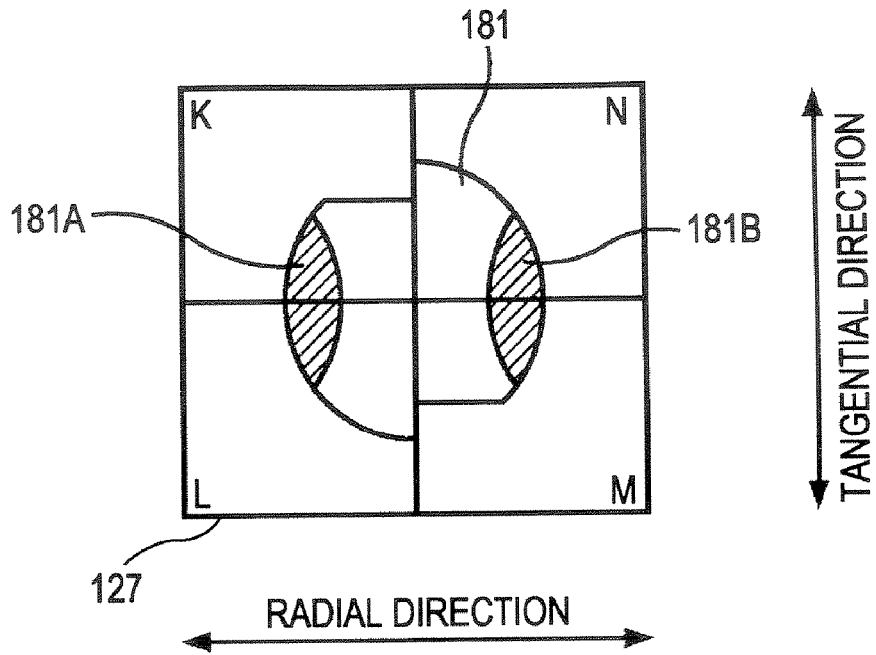
FIG. 7 is an explanatory view of a modification of the light-receiving section of the photodetector shown in FIG. 2.

The photodetector has a light-receiving section including a plurality of rectangular regions that are arranged in the tangential direction and the radial direction of the optical disc (e.g., arranged as shown in FIG. 7). The lens shift signal is detected by a predetermined calculating operation of signals output from the photodetector corresponding to intensities of components of the light beam received by the regions. A push-pull signal is detected by another predetermined calculating operation of the signals output corresponding to the intensities of the components of the light beam. A tracking error signal is detected on the basis of the lens shift signal and the push-pull signal.

The optical pickup further includes a beam splitter (e.g., a polarization beam splitter 344 shown in FIG. 9) disposed in an optical path along which the light beam travels from the optical disc toward the photodetector. The beam splitter splits the light beam into a first light beam and a second light beam. The photodetector has a first light-receiving section (e.g., a light-receiving section 371 in FIG. 9) and a second light-receiving section (e.g., a light-receiving section 372 in FIG. 9). The first light beam is received by the first light-receiving section, and the second light beam is received by the second light-receiving section.

Figure 12:
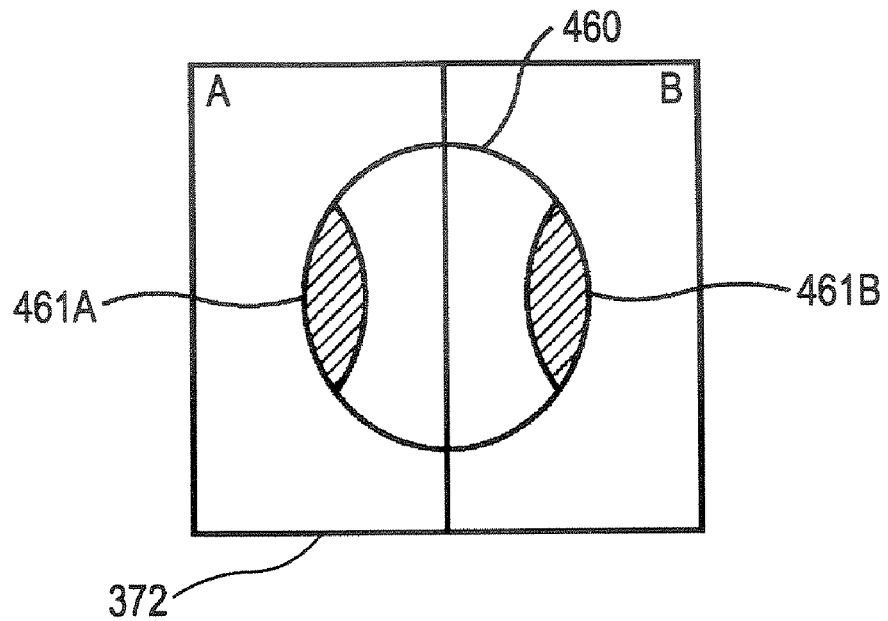
FIG. 12 is an explanatory view of a light-receiving section of the photodetector shown in FIG. 9.

The first light-receiving section includes a plurality of first rectangular regions arranged in the tangential direction of the optical disc (e.g., arranged as shown in FIG. 11), and the second light-receiving section includes a plurality of second rectangular regions arranged in the radial direction of the optical disc (e.g., arranged as shown in FIG. 12).

Figure 13:
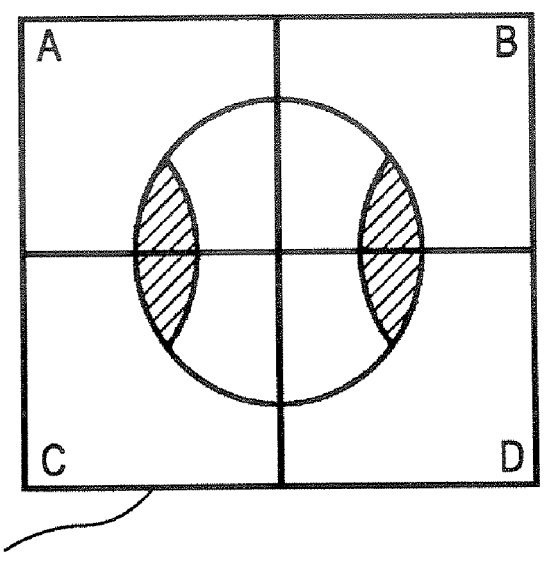
FIG. 13 is an explanatory view of a modification of the light-receiving section of the photodetector shown in FIG. 9.

The second rectangular regions include a plurality of rectangular regions arranged in the tangential and radial directions of the optical disc (e.g., arranged as shown in FIG. 13). A signal corresponding to movement of the objective lens in the tangential direction of the optical disc is detected by a further predetermined calculating operation of the signals output corresponding to the intensities of the components of the second light beam received by the regions of the second light-receiving section.

Figure 1:
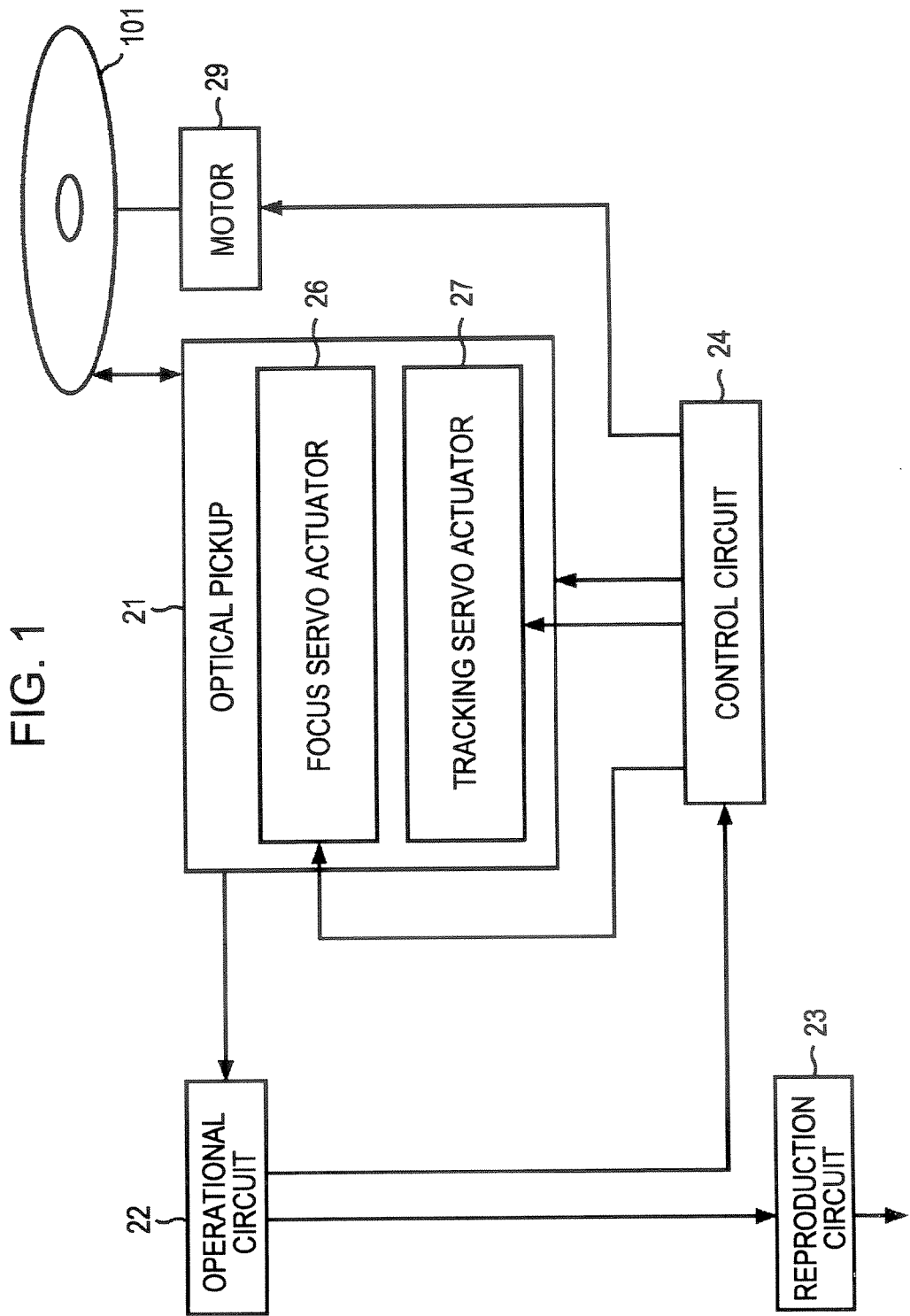
FIG. 1 is a block diagram showing the configuration of an optical disc apparatus to which an embodiment of the present invention is applied.

An optical disc apparatus (e.g., an optical disc apparatus 20 shown in FIG. 1) according to a second embodiment of the present invention records or reproduces an information signal in an optical disc (e.g., an optical recording medium 101 shown in FIG. 1). The optical disc apparatus includes a light source (e.g., a light-emitting element 121 shown in FIG. 2) for emitting a light beam toward the optical disc; an objective lens (e.g., an objective lens 125 shown in FIG. 2) for focusing the light beam emitted from the light source onto a recording surface of the optical disc; a photodetector (e.g., a photodetector 127 shown in FIG. 2) for receiving the light beam reflected by the recording surface of the optical disc and outputting a signal corresponding to an intensity of a spot of the received light beam; and a controller (e.g., a control circuit 24 shown in FIG. 1) for controlling the objective lens to follow the optical disc by detecting a lens shift signal for the objective lens on the basis of the signal output from the photodetector. The spot of the light beam received by the photodetector is asymmetric in both a radial direction and a tangential direction of the optical disc.

Embodiments of the present invention will be described below with reference to the attached drawings.

FIG. 1 is a block diagram of an optical disc apparatus 20 according to a first embodiment of the present invention. The optical disc apparatus 20 includes an optical pickup 21. The optical pickup 21 emits light (laser light) onto an optical recording medium 101, such as a DVD (Digital Versatile Disc), detects the light reflected by the optical recording medium 101 with a light-receiving element having a plurality of light-receiving sections, and outputs detection signals from the light-receiving sections to an operational circuit 22.

The operational circuit 22 calculates a reproduction signal, a focus error signal, and a tracking error signal from the detection signals from the optical pickup 21, outputs the reproduction signal to a reproduction circuit 23, and outputs the focus error signal or the tracking error signal to a control circuit 24.

The reproduction circuit 23 equalizes, binarizes, and demodulates the reproduction signal supplied from the operational circuit 22 while correcting error, and then outputs the signal to a predetermined device (not shown).

The control circuit 24 controls a focus servo actuator 26 according to the focus error signal supplied from the operational circuit 22, for example, corrects a focus error by moving an objective lens provided in the optical pickup 21 along the optical axis. Further, the control circuit 24 controls a tracking servo actuator 27 according to the tracking error signal supplied from the operational circuit 22, for example, corrects a tracking error by moving the objective lens in the radial direction of the optical recording medium 101. In actuality, the focus servo actuator 26 and the tracking servo actuator 27 are combined into one actuator, and an objective lens described below is mounted in the actuator.

The control circuit 24 also controls a motor 29 so as to rotate the optical recording medium 101 at a predetermined speed.

Figure 2:
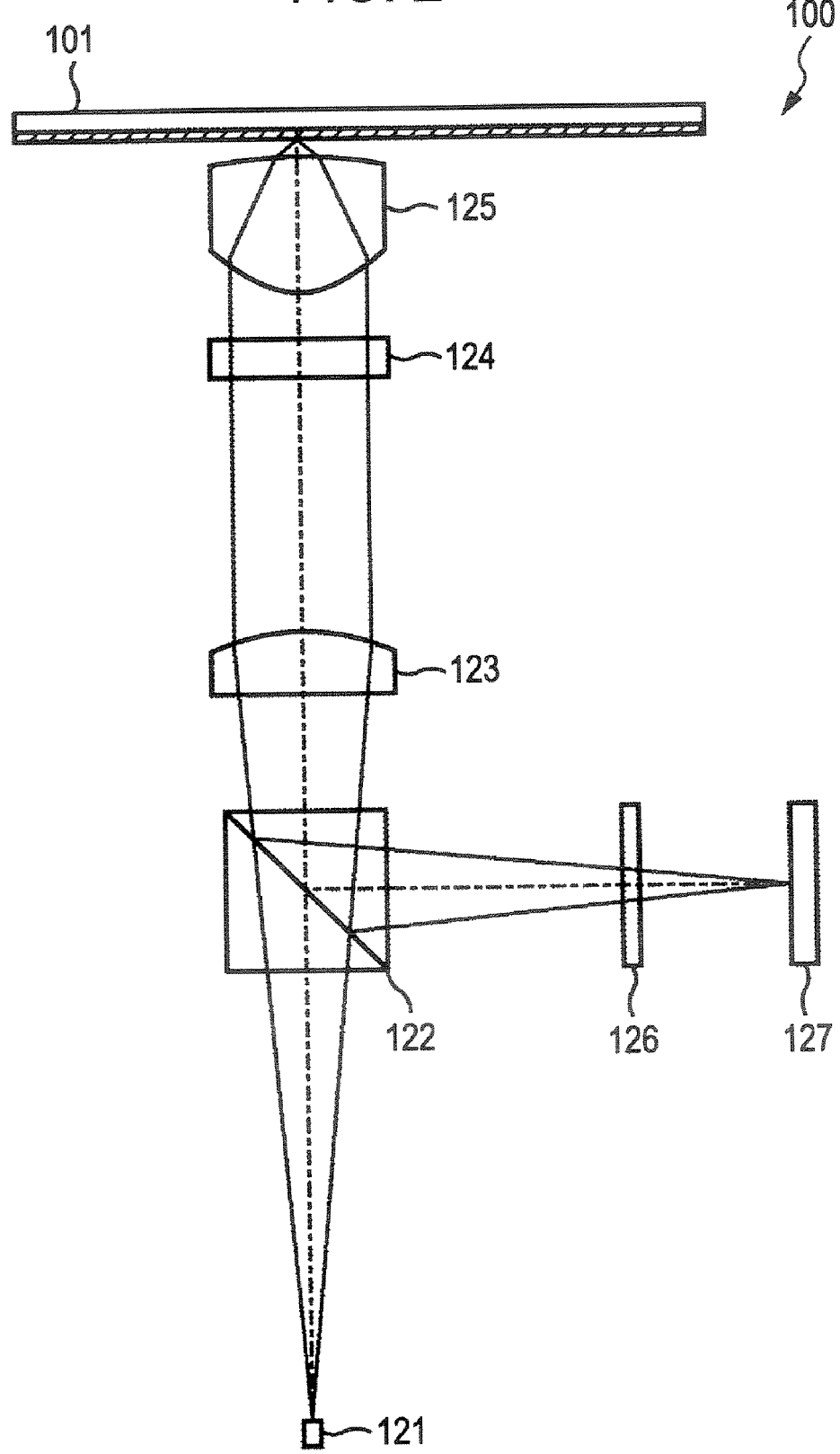
FIG. 2 is an explanatory view showing the configuration of an optical pickup according to a first embodiment.

FIG. 2 is a detailed structural view of an optical pickup 100 serving as the optical pickup 21 shown in FIG. 1.

In FIG. 2, the optical pickup 100 records information on an optical recording medium 101, and reads information recorded on the optical recording medium 101.

A light-emitting element 121, such as a semiconductor laser, emits a light beam (radiation light). The light beam emitted from the light-emitting element 121 passes through a polarization beam splitter (BS) 122, and enters a collimator lens 123.

The collimator lens 123 converts the light beam serving as divergent light into a parallel light beam. After passing through the collimator lens 123, the parallel light beam enters a QWP (quarter-wave plate) 124.

The light beam is converted into a circularly polarized light beam by the QWP 124, and then enters an objective lens 125.

The objective lens 125 converges the incident light beam onto a recording surface (a diagonally shaded surface in FIG. 2) of the optical recording medium 101.

The light beam is reflected by the recording surface of the optical recording medium 101, is converted into a parallel light beam by the objective lens 125, and passes through the QWP 124 again. The light beam is converted by the QWP 124 into a linearly polarized light whose polarization direction is shifted 90° from the polarization direction of the radiation light, passes through the collimator lens 123, and enters the polarization beam splitter 122.

The light beam is reflected by the polarization beam splitter 122, and travels toward a photodetector 127. In this case, the light beam reaches the photodetector 127 through a shielding plate 126.

The photodetector 127 includes a light-receiving element provided on a light-receiving surface, and outputs an electrical signal corresponding to light received by the light-receiving element.

Figure 3:
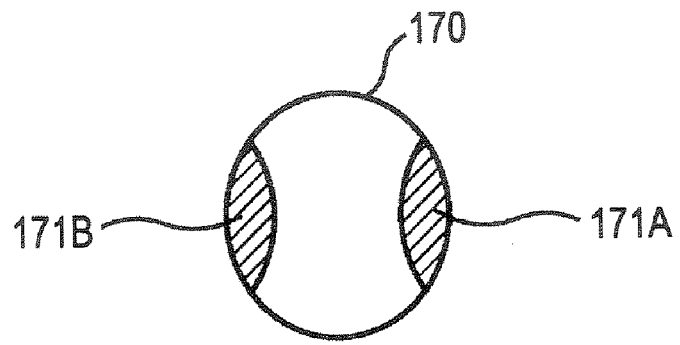
FIG. 3 is an explanatory view showing the shape of a spot of a light beam.

FIG. 3 shows a spot 170 of a light beam formed on a surface (left surface in FIG. 2) of the shielding plate 126 facing the polarization beam splitter 122. The beam spot 170 is substantially circular, and is symmetrical with respect to a segment passing through the center thereof.

With regions 171A and 171B of the spot 170, 0-order light and ±1-order light of a main beam reflected by the recording surface of the optical recording medium 101 overlap. When a light beam is reflected by the optical recording medium 101, ±1-order diffracted light and 0-order light are produced by a track groove. In this case, since a phase difference between the ±1-order diffracted light and the 0-order light varies according to the track position, the optical amplitude modulates in the regions 171A and 171B.

Figure 4:
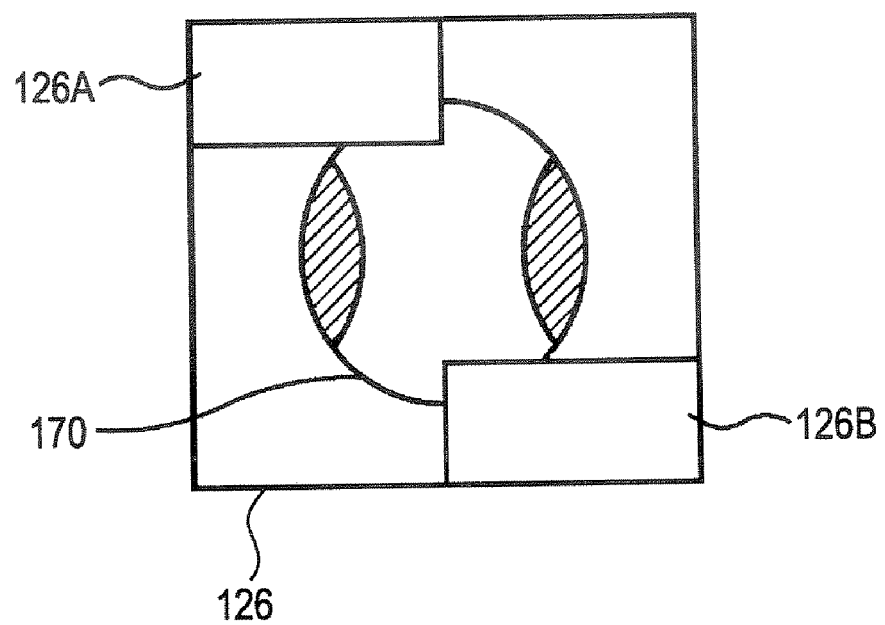
FIG. 4 is a structural view of a shielding plate.

FIG. 4 shows the structure of the shielding plate 126. The shielding plate 126 blocks light in shielding regions 126A and 126B, and transmits light in other regions. Therefore, a left upper portion and a right lower portion of the spot 170 of the light beam passing through the shielding plate 126 are lost, and the spot 170 becomes noncircular.

FIG. 5 shows the structure of the light-receiving section of the photodetector 127. In FIG. 5, a spot 180 of the light beam passing through the above-described shielding plate 126 is formed in the light-receiving section of the photodetector 127. In the light-receiving section, two regions K and L are juxtaposed so as to divide the spot 180 in the tangential direction orthogonal to the radial direction of the disc-shaped optical recording medium 101. Since the spot 180 of the light beam passing through the shielding plate 126 is chipped, as described above, it is asymmetric with respect to a segment extending parallel to the radial direction and passing through the center thereof, and with respect to a segment extending parallel to the tangential direction and passing through the center thereof.

Regions 181A and 181B of the spot 180 correspond to the above-described regions 171A and 171B of the spot 170. With these regions 181A and 181B, 0-order light and ±1-order light of the light beam reflected by the recording surface of the optical recording medium 101 also overlap.

In the regions 181A and 181B, the phase difference between ±1-order diffracted light and 0-order light varies, and the optical amplitude modulates. Therefore, an electrical signal output from the photodetector 127 corresponding to the light intensities of the regions 181A and 181B contains an AC component produced by modulation of the light intensity of the light-receiving section in the radial direction. The AC component is produced by variation of the phase of diffracted light, which is generated by the track structure of the optical disc, according to the spot position, as described above, and serves as an amplitude-modulated signal having a period equal to the track pitch of the optical disc. This signal is called a push-pull signal. A tracking error signal is generated on the basis of the push-pull signal, and is used to generate a control signal for correcting a tracking error.

However, for example, the push-pull signal sometimes contains a DC offset because of lens shifting caused by the movement of the objective lens 125. In order to generate an exact tracking error signal, it is necessary to cancel the DC offset.

For example, when the optical disc rotates, the objective lens follows eccentricity between the rotating center and the track center of the optical disc, and this causes lens shifting. Therefore, a lens shift signal can be generated by detecting the radial motion of the spot position of the light beam reflected by the optical recording medium 101. The lens shift signal corresponds to the above-described DC offset contained in the push-pull signal.

In this embodiment, a DC offset (so-called lens shift signal) is detected by the photodetector 127 having the light-receiving regions juxtaposed in the tangential direction, as shown in FIG. 5.

Figure 6:
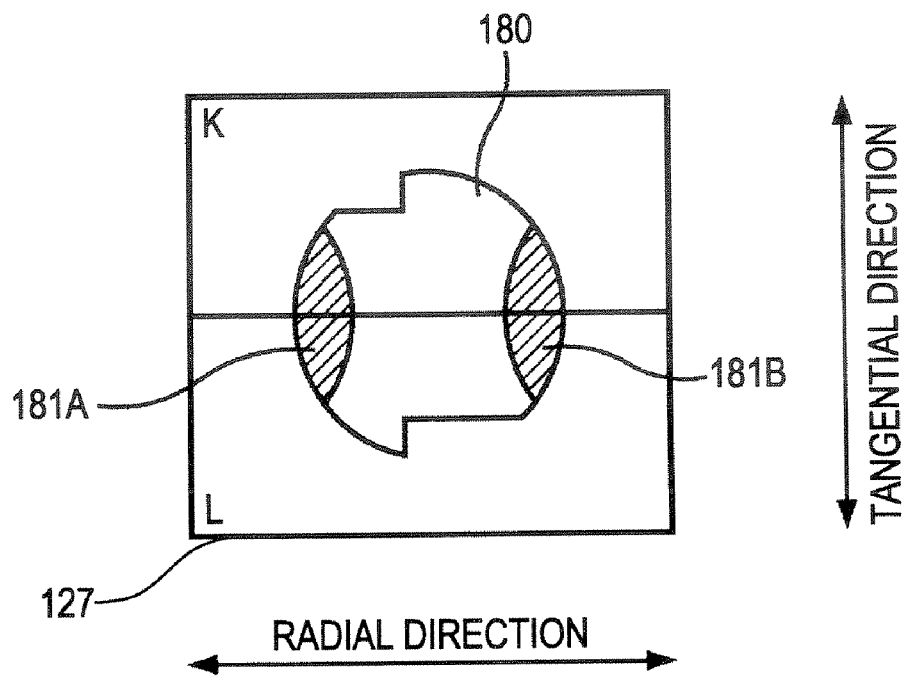
FIG. 6 is an explanatory view showing a case in which a spot shown in FIG. 5 is shifted in the radial direction.

FIG. 6 shows a spot formed in the light-receiving section of the photodetector 127 when lens shifting is caused. The center of a spot 180 in FIG. 6 is shifted in the radial direction (slightly rightward in the figure) from the position shown in FIG. 5. When the spot 180 is shifted in the radial direction, the shapes (sizes) of portions of the spot 180 shielded by the shielding regions 126A and 126B of the shielding plate 126 differ from those in FIG. 5.

That is, in FIG. 5, since lens shifting does not occur, the area of a portion of the spot 180 formed in the upper region K of the light-receiving section of the photodetector 127 is substantially equal to the area of a portion formed in the lower region L. In contrast, in FIG. 6, since lens shifting occurs, the area of a portion of the spot 180 formed in the upper region K is larger than the area of a portion formed in the lower region L.

In this way, the movement of the spot position of the light beam in the radial direction of the optical disc caused by lens shifting appears as the change in the shape of the spot formed in the light-receiving section. Therefore, a lens shift signal can be detected by calculating a difference between signals output from the regions of the light-receiving section of the photodetector 127. In this case, a lens shift signal LS is given by the following expression:

$$LS=K-L$$

where K and L represent the values of signals output from the regions K and L, respectively.

As described above, since the spot 180 received by the photodetector 127 is asymmetric in both the radial and tangential directions in this embodiment, a so-called lens shift signal can be detected by a photodetector having a light-receiving section including regions juxtaposed in the tangential direction. For example, in most photodetectors for detecting a focus error signal, a light-receiving section is divided in the tangential direction into a plurality of regions. According to this embodiment, a lens shift signal can also be detected by such a photodetector for detecting a focus error signal. Therefore, a tracking error can be precisely corrected at low cost.

While detection of the lens shift signal by the optical pickup 100 has been described above, a tracking error signal can also be detected by changing the structure of the light-receiving section of the photodetector 127.

In order to detect a tracking error signal, the light-receiving section of the photodetector 127 is configured, as shown in FIG. 7. Unlike FIG. 5, the light-receiving section of the photodetector 127 is divided in two in the tangential direction and in two in the radial direction, that is, the light-receiving section is divided into four regions K, L, M, and N in FIG. 7. A tracking error signal TRK is given by the following expression for calculation similar to that in a differential push-pull method:

$$TRK=(K+L)-(M+N)-k\{(K+N)-(L+M)\}$$

where K, L, M, and N represent values of signals output from the four regions K, L, M, and N, and k represents a predetermined coefficient.

That is, a push-pull signal is detected from a difference between signals output from the regions juxtaposed in the radial direction, and a lens shift signal is detected from a difference between signals output from the regions juxtaposed in the tangential direction. By subtracting the product of the lens shift signal and the predetermined coefficient from the push-pull signal, a DC offset contained in the push-pull signal is cancelled. Consequently, an exact tracking error signal is generated.

In the conventional differential push-pull method, for example, a tracking error signal is detected by calculating a difference between a push-pull signal (first push-pull signal) obtained from a main beam and a push-pull signal (second push-pull signal) obtained from a sub-beam.

That is, in the differential push-pull method, a DC offset (lens shift signal) is cancelled by performing differential operation of the push-pull signal obtained from the main beam and the push-pull signal obtained from the sub-beam.

In this case, however, the sub-beam also contains a push-pull component. In order to detect lens shifting, there is a need to adjust the position of the sub-beam so that the push-pull signal obtained from the sub-beam has a phase opposite to that of the main beam. Further, in order to prevent the phase of the push-pull component in the sub-beam from shifting between the inner periphery and the outer periphery of the optical disc, the distance between the main beam and the sub-beam is not increased. For example, when information is recorded or read onto or from an optical disc serving as a multilayer recording medium, characteristics of the lens shift signal and the tracking error signal may be worsened by stray light from other layers.

In contrast, since a lens shift signal can be detected without generating a sub-beam in this embodiment, information can be recorded or read on or from the optical disc without any influence of stray light from the other layers.

While the spot 180 formed in the light-receiving section of the photodetector 127 is made asymmetric in both the radial and tangential directions by the shielding plate 126 in this embodiment, the shape of the light-receiving section of the photodetector 127 may be asymmetrical in both the directions.

FIG. 8 shows another example of a structure of the light-receiving section of the photodetector 127. In this structure, a region K, of two regions arranged in the tangential direction, is chipped on the upper left side, and a region L is chipped on the lower right side.

Similarly to the case shown in FIG. 6, when lens shifting occurs, the area of a portion of the spot 180 formed in the upper region K is different from the area of a portion formed in the lower region L. Therefore, a lens shift signal can be detected by obtaining a difference between signals output from the regions K and L.

Figure 9:
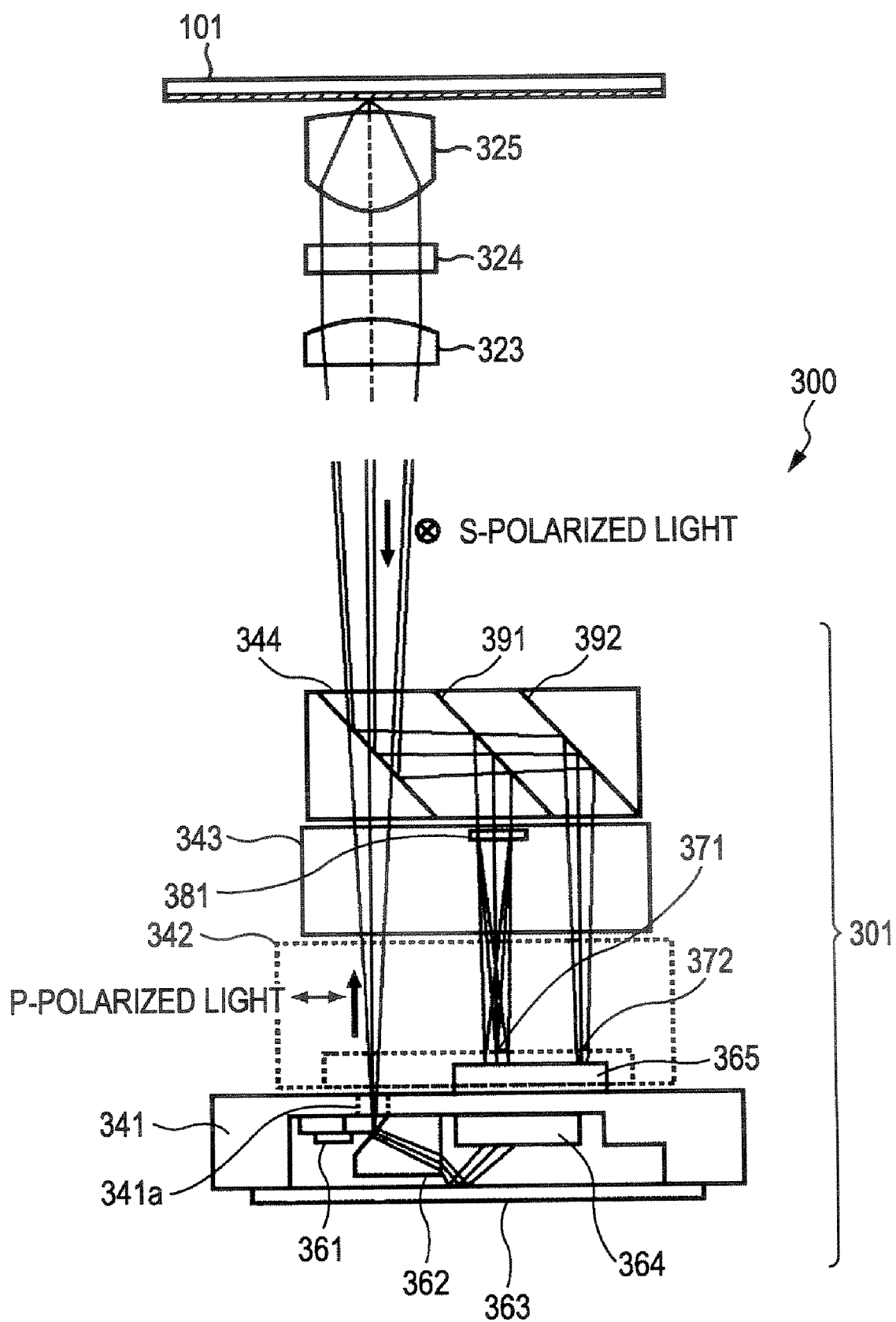
FIG. 9 is a block diagram showing the configuration of an optical pickup according to a second embodiment of the present invention.

An optical pickup 300 according to a second embodiment of the present invention will now be described with reference to FIG. 9. In FIG. 9, a collimator lens 323, a QWP 324, and an objective lens 325 are similar to those in FIG. 2, and therefore, detailed descriptions thereof are omitted.

Unlike the optical pickup 100, the optical pickup 300 includes an optical detecting device 301 serving as an integrated optical device. In the optical detecting device 301, a holder 341, a spacer 342, a compound lens 343, and a polarization beam splitter 344 are combined.

A light-emitting element 361 is provided in the holder 341. A light beam emitted from the light-emitting element 361 is separated by a folding mirror 362, that is, about 20% of the light beam is transmitted, and about 80% of the light beam is reflected. The transmitted light beam passes through the folding mirror 362, is reflected by a reflecting lid 363, and enters a photodetector 364. A signal output from a light-receiving section of the photodetector 364 is used for automatic power control (APC) and laser noise canceling (LNC) of the light-emitting element 361.

In contrast, the reflected light beam from the folding mirror 362 passes as an advancing light beam through an aperture 341a provided in the holder 341, and enters the compound lens 343 fixed to the holder 341 by the spacer 342. Then, the light beam passes through the polarization beam splitter 344 while being negligibly reflected, and is focused onto a recording surface of an optical recording medium 101 through the collimator lens 323, the QWP 324, and the objective lens 325.

The light beam is reflected by the recording surface of the optical recording medium 101, passes as a returning light beam through the objective lens 325, the QWP 324, and the collimator lens 324 again, and enters the polarization beam splitter 344. In a manner similar to that in the optical pickup device 100, the returning light beam reflected by the recording surface passes through the QWP 324 twice, and therefore, the polarization direction thereof is orthogonal to that of the advancing light beam. For example, when the advancing light beam is P-polarized light, the returning light beam is S-polarized light. About 100% of the returning light beam incident on the polarization beam splitter 344 is reflected, and travels toward a half mirror 391. The half mirror 391 transmits and directs about 50% of the incident light beam toward a total reflection mirror 392, and reflects and directs about 50% of the incident light beam toward the compound lens 343.

The light beam reflected by the half mirror 391 passes through a diffraction grating 381 provided in the compound lens 343, and is received by a light-receiving section 371 of a photodetector 365 provided in the spacer 342. In contrast, about 100% of the light beam passing through the half mirror 391 is reflected by the total reflection mirror 392, passes through the compound lens 343, and is received by a light-receiving section 372 of the photodetector 365.

Figure 10:
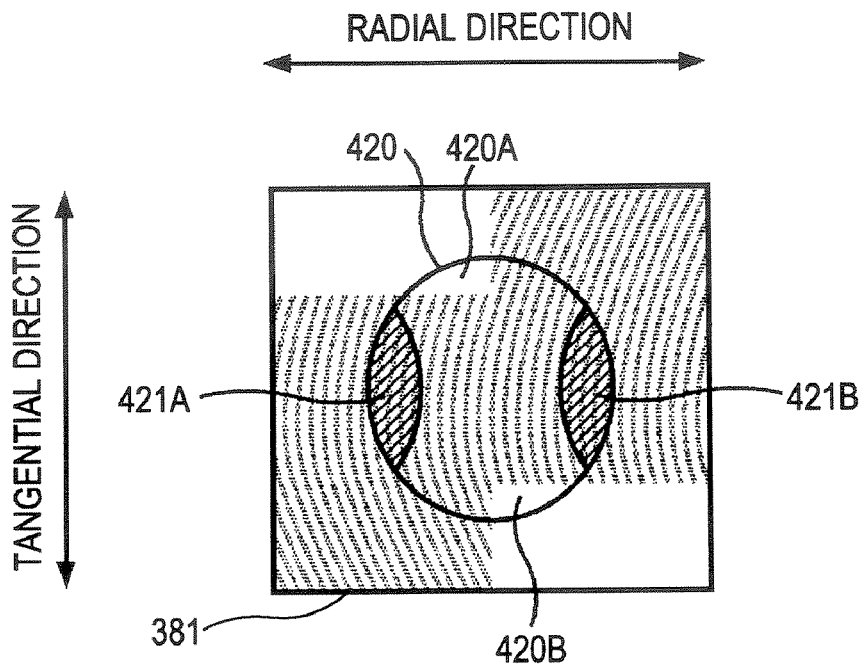
FIG. 10 is a structural view of a diffraction grating shown in FIG. 9.

FIG. 10 shows the diffraction grating 381 and a spot 420 of the returning light beam formed on the diffraction grating 381. With regions 421A and 421B of the spot 420, 0-order light and ±1-order light of a main beam reflected by the recording surface of the optical recording medium 101 overlap.

In FIG. 10, the diffraction grating 381 is hatched in a wavy form, and is shaped like a rectangle that is chipped on the upper left side and the lower right side thereof. That is, the diffraction grating 381 is configured so that the spot 420 of the diffracted light beam is asymmetric in both the radial and tangential directions of the optical disc.

The diffraction grating 381 produces ±1-order light beams from light passing therethrough. One of the produced ±1-order light beams is focused on the back side of the light-receiving section 371 of the photodetector 365, and the other light beam is focused on the front side of the light-receiving section 371. Further, the diffraction grating 381 provides an advantage similar to that of a cylindrical lens, and enlarges the spot of the light beam passing therethrough in the tangential direction of the optical disc.

Portions of the spot 420 of the returning light beam that do not pass through the diffraction grating 381 are not guided to the light-receiving section 371. The spot of ±1-order light passing through the diffraction grating 381 and guided to the light-receiving section 371 is asymmetric in both the radial and tangential directions of the optical disc such as to conform to the shape of the diffraction grating 381. That is, the spot 420 of the light beam guided to the light-receiving section 371 is not circular, but has chipped regions 420A and 420B.

FIG. 11 shows the structure of the light-receiving section 371. The light-receiving section 371 includes a light-receiving portion 371-1 that receives one light beam focused on the front side, of the ±1-order light beams passing through the diffraction grating 381, and a light-receiving portion 371-2 that receives the other light beam focused on the back side. The light-receiving portion 371-1 includes three regions K, W, and L arranged in the tangential direction of the optical disc. The light-receiving portion 371-2 includes three regions N, Z, and M arranged in the tangential direction of the optical disc.

FIG. 11 also shows light beam spots 431 and 432 received by the light-receiving portions 371-1 and 371-2. By means of the above-described effect of the cylindrical lens of the diffraction grating 381, the spots 431 and 432 are long only in the tangential direction, and the radial length thereof is about zero. However, the spots 431 and 432 are asymmetric in both the radial and tangential directions of the optical disc such as to conform to the shape of the diffraction grating 381, as described above.

Therefore, in a manner similar to that shown in FIG. 6, when lens shifting occurs, the areas of the portions of the spots 431 and 432 formed in the regions K and M are different from the areas of the portions formed in the regions L and N. Accordingly, a lens shift signal can be detected by finding a difference between signals output from the regions.

FIG. 12 shows the structure of the light-receiving section 372. As shown in FIG. 12, the light-receiving section 372 includes two regions A and B arranged in the disc radial direction. Regions 461A and 461B of a light beam spot 460 received by the light-receiving section 372 correspond to the above-described regions 421A and 421B, and 0-order light and ±1-order light reflected by the recording surface of the optical recording medium 101 overlap with these regions.

In the optical pickup 300, a push-pull signal is detected on the basis of signals output from the light-receiving section 372, and a lens shift signal is detected on the basis of signals output from the light-receiving section 371. A DC offset contained in the push-pull signal is cancelled by means of calculation similar to that used in the differential push-pull method, and consequently, a tracking error signal can be detected precisely.

That is, a lens shift signal LS is given by the following expression:

$$LS=(K+M)-(L+N)$$

where A, B, K, W, L, N, Z, and M represent signals output from the regions A, B, K, W, L, N, Z, and M, respectively.

Therefore, a tracking error signal TRK is given by the following expression:

$$TRK=(A-B)-k\{(K+M)-(L+N)\}$$

As described above, the light-receiving portion 371-1 receives one light beam focused on the front side, of the ±1-order light beams passing through the diffraction grating 381, and the light-receiving portion 371-2 receives the other light beam focused on the back side. Therefore, a focus error signal FE can also be detected by a spot-size detection method.

That is, the focus error signal FE is given by the following expression:

$$FE=Z+(K+L)-\{(W+(M+N)\}$$

Further, a RF signal RF is found from a signal output from the light-receiving section 372 according to the following expression:

$$RF=(A+B)$$

In this way, in the optical pickup 300 according to the embodiment of the present invention, a tracking error signal and a focus error signal can be precisely detected with a simple and inexpensive configuration, and a RF signal can also be detected properly.

While the lens shift signal is detected by detecting the shift of the light beam spot in the radial direction due to lens shifting in the above description, when tracking of the optical disc is actually performed, the light beam spot sometimes shifts in the tangential direction, for example, because of disc tilting.

As described above, in this embodiment, a lens shift signal is detected on the basis of a difference between signals output from the regions of the light-receiving section arranged in the tangential direction. Therefore, when the light beam spot is shifted in the tangential direction by disc tilting, the difference between the signals output varies, regardless of the occurrence of lens shifting, because the areas of the spot portions formed in the regions are made different by shifting of the spot. That is, when disc tilting occurs, noise is caused in the lens shift signal.

Such noise caused in the lens shift signal by the shift of the light beam spot in the tangential direction due to disc tilting can be eliminated as follows:

In order to eliminate the noise in the lens shift signal, the light-receiving section 372 of the photodetector 365 in the optical pickup 300 is configured, as shown in FIG. 13.

FIG. 13 shows another example of a structure of the light-receiving section 372 of the photodetector 365. Unlike the structure shown in FIG. 12, the light-receiving section 372 is divided in two in the tangential direction and in two in the radial direction, that is, divided into four regions A to D. In this case, the light-receiving section 371 has the same structure as that in FIG. 11, and the photodetector 365 outputs signals indicated by A, B, C, D, K, W, L, N, Z, and M from the regions of the light-receiving section 371 and the regions of the light-receiving section 372.

With this structure, a tracking error signal TRK is precisely given by the following expression:

$$TRK=(A+C)-(B+D)-\alpha[\{(K+M)-(L+N)\}-\beta\{(A+B)-(C+D)\}]$$

where $\alpha$ and $\beta$ are predetermined coefficients.

By performing this calculation, the change in balance of the intensities of light (areas of spot portions) received by the light-receiving section 372 in the tangential direction is detected as noise in the lens shift signal, and the noise is canceled on the basis of the signal output from the light-receiving section 371. Therefore, the tracking error signal can be detected more precisely.

Figure 14:
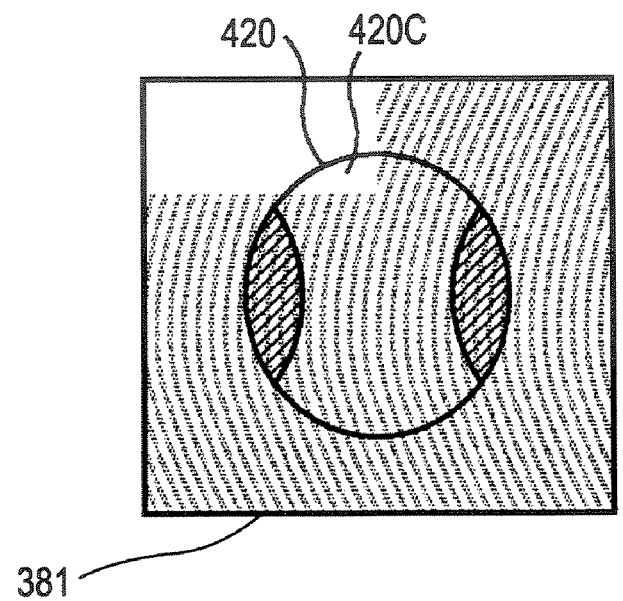
FIG. 14 is an explanatory view of a modification of the diffraction grating shown in FIG. 9.

FIG. 14 shows another example of a structure of the diffraction grating 381. Unlike the structure shown in FIG. 10, the diffraction grating 381 is shaped like a rectangle chipped only on the upper left side. A spot 420 of a light beam, which is incident on and is diffracted by the diffraction grating 381, is asymmetric in both the disc radial and tangential directions. That is, the spot 420 guided to the light-receiving section 371 is not circular, but has a chipped region 420C.

By thus shaping the diffraction grating 381, loss of the light beam can be reduced. For example, when a RF signal is detected by using the same spot, deterioration of the RF signal can be prevented.

Figure 15:
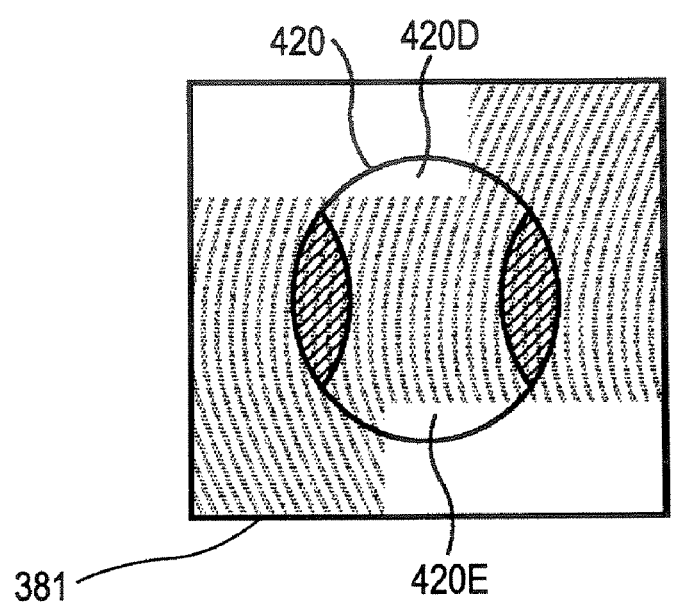
FIG. 15 is an explanatory view of another modification of the diffraction grating shown in FIG. 9.

FIG. 15 shows a further example of a structure of the diffraction grating 381. While the diffraction grating 381 in FIG. 15 is shaped like a rectangle having upper left and lower right chipped portions, in a manner similar to that in FIG. 10, the areas of the chipped portions are larger than those in FIG. 10. In this case, a spot 420 of a light beam guided to the light-receiving section 371 is not circular, and has chipped regions 420D and 420E.

In FIG. 10, the right edge (side) of the upper left chipped portion of the rectangle is substantially aligned with the tangential segment passing through the center of the spot 420. In contrast, in FIG. 15, the right edge of the upper left chipped portion of the rectangle is shifted to the right in the radial direction from the position shown in FIG. 10. Further, while the left edge (side) of the lower right chipped portion of the rectangle shown in FIG. 10 is substantially aligned with the tangential segment passing through the center of the spot 420, the left edge of the lower right chipped portion of the rectangle in FIG. 15 is shifted to the left in the radial direction from the position shown in FIG. 10.

By thus shaping the diffraction grating 381, when the light beam spot shifts in the radial direction, the difference between the areas of the light spots received by the regions arranged in the tangential direction in the light-receiving section increases. Therefore, the amplitude of the detected lens shift signal increases, and this increases the sensitivity of the lens shift signal.

Figure 16:
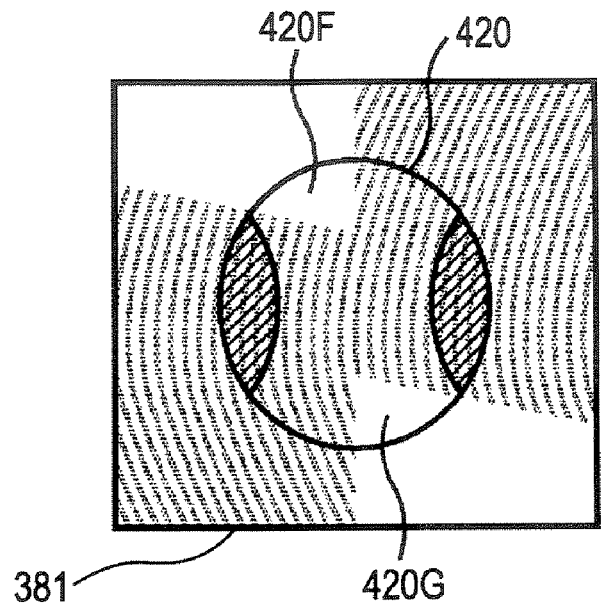
FIG. 16 is an explanatory view of a further modification of the diffraction grating shown in FIG. 9.

FIG. 16 shows a still further example of a structure of the diffraction grating 381. While the diffraction grating 381 in FIG. 16 is shaped like a rectangle having upper left and lower right chipped portions, in a manner similar to that in FIG. 10, these chipped portions are different in shape from those in FIG. 10. In this case, a spot 420 of a light beam guided to the light-receiving section 371 is not circular, but has chipped regions 420F and 420G.

In FIG. 10, the upper left and lower right chipped portions are rectangular. In contrast, the lower right corner of the upper left chipped portion and the upper left corner of the lower right chipped portion in FIG. 16 are acute-angled, and are closer to the center of the spot 420 than in FIG. 10.

By thus shaping the diffraction grating 381, even when the size of the spot received by the light-receiving section is changed by defocusing, the difference between the areas of the spot portions received by the regions arranged in the tangential direction in the light-receiving section, as shown in FIG. 11, is prevented from changing markedly.

For example, when a light beam passes through the diffraction grating 381 shown in FIG. 10, it forms, on the light-receiving section, a spot 420 which is not circular, but has chipped portions 420A and 420B (upper left and lower right sides). In a case in which the light beam passing through the diffraction grating 381 shown in FIG. 10 is received by the light-receiving portion 371-1 (or 371-2) shown in FIG. 11, when the size of the received spot is changed by defocusing, the central region W (or Z) among the regions arranged in the tangential direction sometimes includes or does not include the chipped portions of the spot. Therefore, the area of the spot received by the region W (or Z) greatly differs, depending on whether the amount of defocusing exceeds a predetermined value.

In this case, a detected focus error signal also greatly differs, depending on whether the amount of defocusing exceeds the predetermined value, and it may be difficult to correct a focus error.

In contrast, when a light beam passing through the diffraction grating 381 shown in FIG. 16 is received by the light-receiving portion 371-1 shown in FIG. 11, even when the size of a received spot is changed by defocusing, the central region W among the regions arranged in the tangential direction always includes the chipped portions 420F and 420G of the spot. Therefore, a detected focus error signal does not greatly differ, depending on whether the amount of defocusing exceeds the predetermined value, but changes more linearly. Consequently, the characteristic (linearity) of the focus error signal can be improved further.

Figure 17:
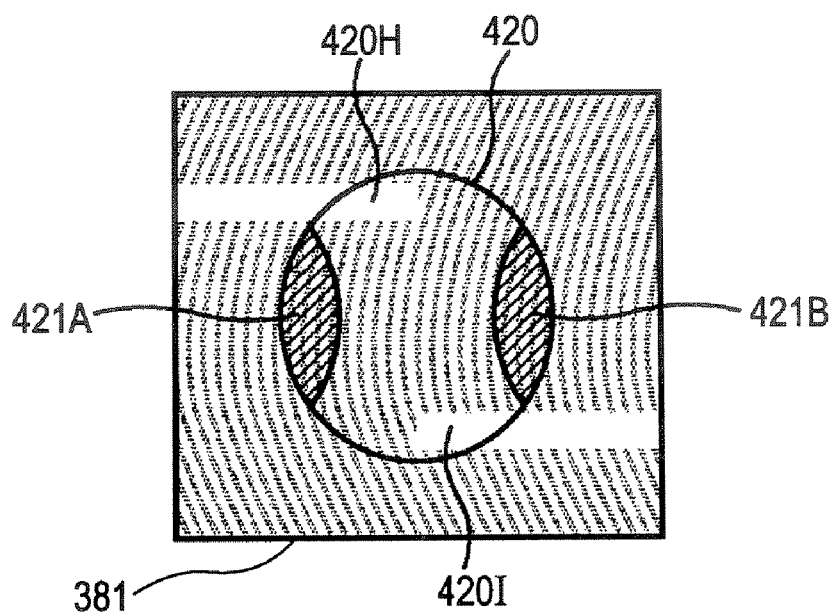
FIG. 17 is an explanatory view of a still further modification of the diffraction grating shown in FIG. 9.

FIG. 17 shows a still further example of a structure of the diffraction grating 381. While the diffraction grating 381 shown in FIG. 17 is shaped like a rectangle having upper left and lower right chipped portions, similarly to the structure shown in FIG. 10, the areas of the chipped portions are smaller than those in FIG. 10. In this case, a spot 420 of a light beam guided to the light-receiving section 371 is not circular, but has chipped regions 420H and 420I.

By thus shaping the diffraction grating 381, even when the size of the spot received by the light-receiving section 371 is changed by defocusing, the proportion of the areas of the chipped regions to the total area of the spot is prevented from being changed markedly.

For example, a light beam passing through the diffraction grating 381 shown in FIG. 10 forms, on the light-receiving section 371, a spot 420 that is not circular, but has chipped regions 420A and 420B (upper left and lower right sides). When the spot 420 is made larger (such as to have a larger radius) by defocusing, the proportion of the areas of the chipped regions to the total area of the spot increases. In contrast, when the spot 420 is made smaller (such as to have a smaller radius) by defocusing, the proportion decreases.

In this case, the peak value of a detected focus error signal is greatly different, for example, between defocusing to a far side and defocusing to a near side. Therefore, it may be difficult to precisely correct a focus error.

In contrast, even when a spot 420 of a light beam passing through the diffraction grating 381 shown in FIG. 17 is made larger or smaller by defocusing (such as to have a larger or smaller radius), the proportion of the chipped regions 420H and 420I to the entire spot is kept substantially constant. Therefore, the peak characteristic of a detected focus error signal can be improved further.

While the examples of structures of the diffraction grating 381 are shown in FIGS. 14 to 17, for example, the shielding plate or the light-receiving section of the photodetector may have a shape corresponding to any of FIGS. 14 to 17.

When the shielding plate has a shape corresponding to any of FIGS. 14 to 17, it includes shielding portions provided corresponding to the chipped regions of the diffraction grating in the figure (portions where the diffraction grating is not provided). The light-receiving section of the photodetector can be shaped similarly to the diffraction grating 381 shown in any of FIGS. 14 to 17.

While the above-described optical pickup 300 shown in FIG. 9 has an integrated optical device, an optical pickup having no integrated optical device may be used to detect a focus error signal.

Figure 18:
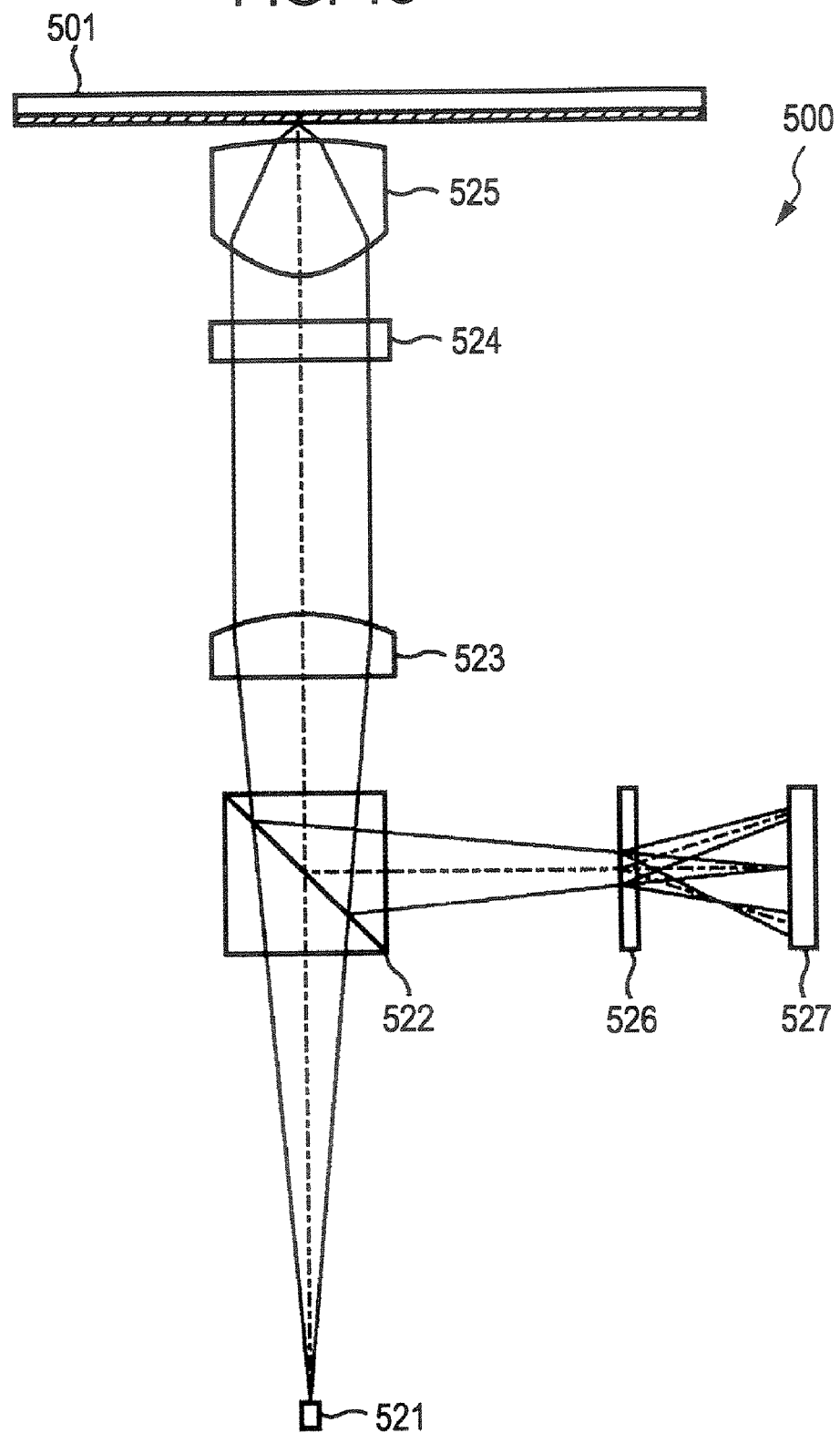
FIG. 18 is an explanatory view of an optical pickup according to a third embodiment of the present invention.

FIG. 18 shows an optical pickup 500 according to a third embodiment of the present invention, and the optical pickup 500 does not include an integrated optical device. Since a light-emitting element 521, a polarization beam splitter 522, a collimator lens 523, a quarter-wave plate 524, and an objective lens 525 in FIG. 18 are similar to the light-emitting element 121, the polarization beam splitter 122, the collimator lens 123, the quarter-wave plate 124, and the objective lens 125 in FIG. 2, detailed descriptions thereof are omitted.

The optical pickup 500 includes a diffraction grating 526, instead of the shielding plate 126 shown in FIG. 2. The diffraction grating 526 produces ±1-order light beams from light passing therethrough. One of the ±1-order light beams is received as a spot focused on the back side of the light-receiving section of a photodetector 527. The other light beam is received as a spot focused on the front side of the light-receiving section of the photodetector 527.

Therefore, in the optical pickup 500, a lens shift signal can be detected, and a focus error signal can be detected by a spot-size detection method, in a manner similar to that in the optical pickup 100 shown in FIG. 2.

Figure 19:
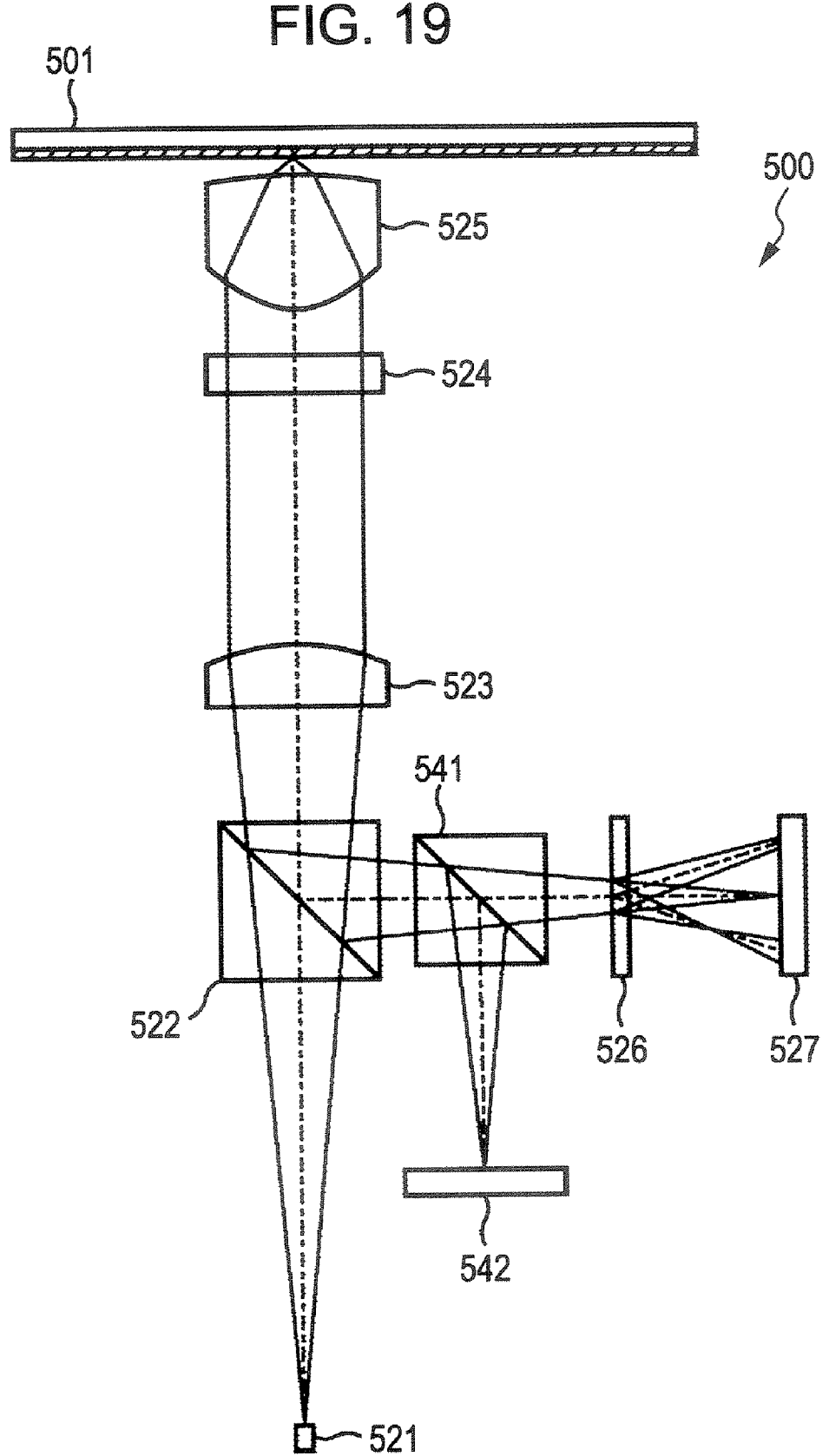
FIG. 19 is an explanatory view of an optical pickup serving as a modification of the optical pickup according to the third embodiment.

FIG. 19 shows a modification of the optical pickup 500 shown in FIG. 8. In FIG. 19, a folding mirror 541 and a photodetector 542 are added to the optical pickup 500.

A folding mirror 541 separates light that is reflected by a polarization beam splitter 522 and travels toward a photodetector 527, that is transmits about 50% of the light and reflects about 50% of the light. The transmitted light is received by a light-receiving section of the photodetector 527 through a diffraction grating 526, and the reflected light is received by a light-receiving section of the photodetector 542.

Therefore, in the optical pickup 500 shown in FIG. 19, a focus error signal is detected by a spot-size detection method, a push-pull signal is detected on the basis of a signal output from the light-receiving section of the photodetector 542, and a lens shift signal is detected on the basis of a signal output from the light-receiving section of the photodetector 527. A DC offset contained in the push-pull signal is cancelled by means of calculation similar to that used in a differential push-pull method, and this allows precise detection of a tracking error signal.

The above-described structures of the diffraction grating shown in FIGS. 10 and 14 to 17 can be applied to the diffraction grating 526 in FIG. 18 or 19. The structure of the light-receiving section shown in FIG. 11 can be applied to the light-receiving section of the photodetector 527 in FIG. 18 or 19. Further, the structures of the light-receiving section shown in FIGS. 12 and 13 can be applied to the light-receiving section of the photodetector 542 in FIG. 19.

Figure 20:
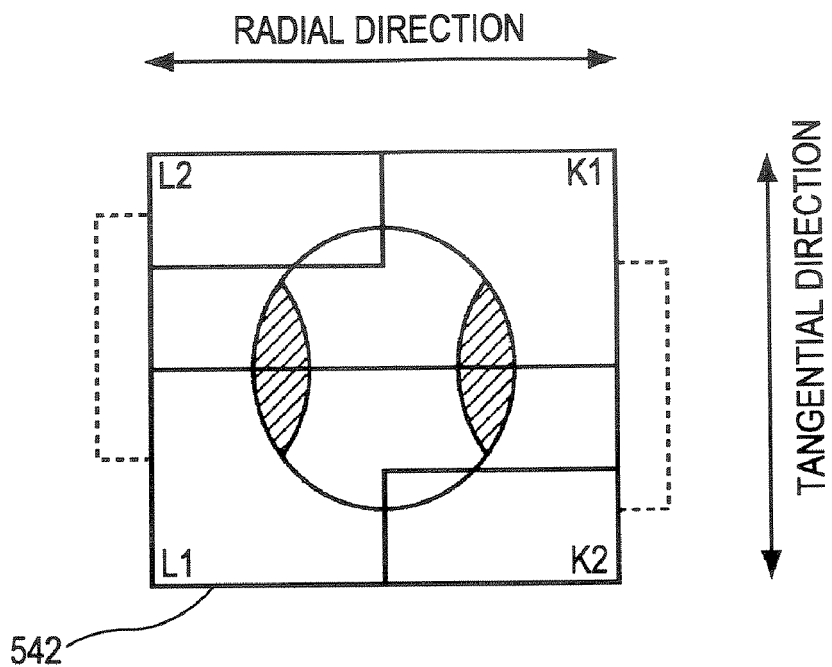
FIG. 20 is a structural view of a light-receiving section of a photodetector shown in FIG. 2, 18, or 19.

FIG. 20 shows another example of a structure of the light-receiving section of the photodetector 127 shown in FIG. 2, the light-receiving section of the photodetector 542 shown in FIG. 19, or the light-receiving section of the photodetector 527 shown in FIG. 18 or 19. In the following description, the structure shown in FIG. 20 is applied to the light-receiving section of the photodetector 542 in FIG. 19.

FIG. 20 also shows a spot of received light formed in the light-receiving section of the photodetector 542. The light-receiving section includes regions K1, K2, L1, and L2. For example, the regions K1 and L2 correspond to the region K, of the two regions arranged in the tangential direction in FIG. 5, and the region L2 corresponds to the upper left chipped portion of the spot 180 received by the region K in FIG. 5. Similarly, the regions L1 and K2 correspond to the region L shown in FIG. 5, and the region K2 corresponds to the lower right chipped portion of the spot 180 received by the region L in FIG. 5.

As described above with reference to FIG. 6, when lens shifting occurs, the center of the spot formed on the light-receiving section of the photodetector 542 shifts in the radial direction, and the areas of portions of the spot formed in the regions of the light-receiving section are different. That is, when lens shifting does not occur, the area of a portion of the spot formed in the region K1 in FIG. 20 is substantially equal to the area of a portion formed in the region L1, and the area of a portion formed in the region K2 is substantially equal to the area of a portion formed in the region L2. In contrast, for example, when the spot is shifted to the right in FIG. 20 by lens shifting, the area of the portion formed in the region K1 becomes larger than the area of the portion formed in the region L1, and the area of the portion formed in the region K2 becomes larger than the area of the portion formed in the region L2.

In this way, shifting of the spot of the light beam in the disc radial direction due to lens shifting appears as the change of the shape of the spot on the light-receiving section. Therefore, a lens shift signal can be detected by finding a difference between signals outputs form the regions of the light-receiving section of the photodetector 542. In this case, a lens shift signal LS is given by the following expression:

$$LS=(K1-L1)+(K2-L2)$$

where K1, K2, L1, and L3 represent values of signals output form the regions K1, K2, L1, and L2, respectively.

For example, when the light-receiving section of the photodetector 542 has a structure shown in FIG. 5, a value (K2−L2) in the above expression is not contained in the lens shift signal LS, and the amplitude of the detected lens shift signal LS is not so large. Therefore, when a DC offset contained in a push-pull signal is cancelled on the basis of the lens shift signal by means of calculation similar to that used in a differential push-pull method, it may be difficult to precisely find the DC offset.

In contrast, when the light-receiving section of the photodetector 542 has a structure shown in FIG. 20, the amplitude of a detected lens shift signal LS is sufficiently large. As a result, it is possible to cancel a DC offset contained in a push-pull signal on the basis of the lens shift signal by means of calculation similar to that used in the differential push-pull method, and to detect a precise tracking error signal.

By wiring the regions K1 and K2 and the regions L1 and L2 of the light-receiving section of the photodetector 542, as shown by dotted lines in FIG. 20, the values of signals obtained from the regions can be obtained as K and L in the following expression:

$$K=K1+K2$$

$$L=L1+L2$$

Then, a lens shift signal can be given by the following expression:

$$LS=K-L$$

That is, instead of converting current values respectively output from the regions K1, K2, L1, and L2 into voltage values and calculating a lens shift signal from the voltage values, a lens shift signal may be calculated on the basis of a voltage value converted from a current value output from two regions K1 and K2, and a voltage value converted from a current value output from two regions L1 and L2. This can reduce the number of I/V conversion circuits for converting the current value into the voltage value.

Figure 21:
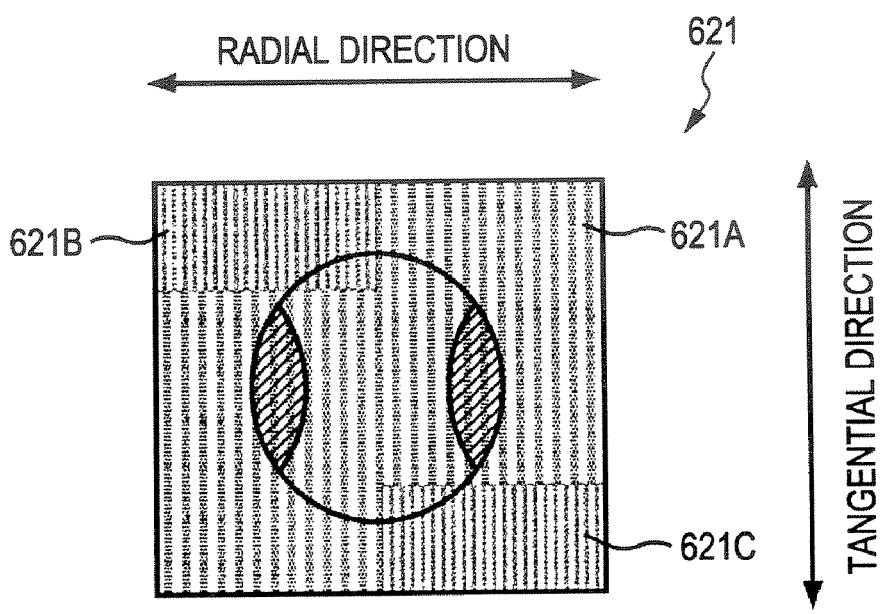
FIG. 21 is a structural view of a diffraction grating shown in FIG. 18 or 19.

The diffraction grating 526 shown in FIG. 18 or 19 may have a structure shown in FIG. 21. FIG. 21 also shows the shape of a spot of a light beam passing through the diffraction grating. A diffraction grating 621 shown in FIG. 21 is divided into regions 621A to 621C. In this case, ±1-order light beams diffracted by the regions 621A to 621C are received at different positions on the light-receiving section of the photodetector 527.

Figure 22:
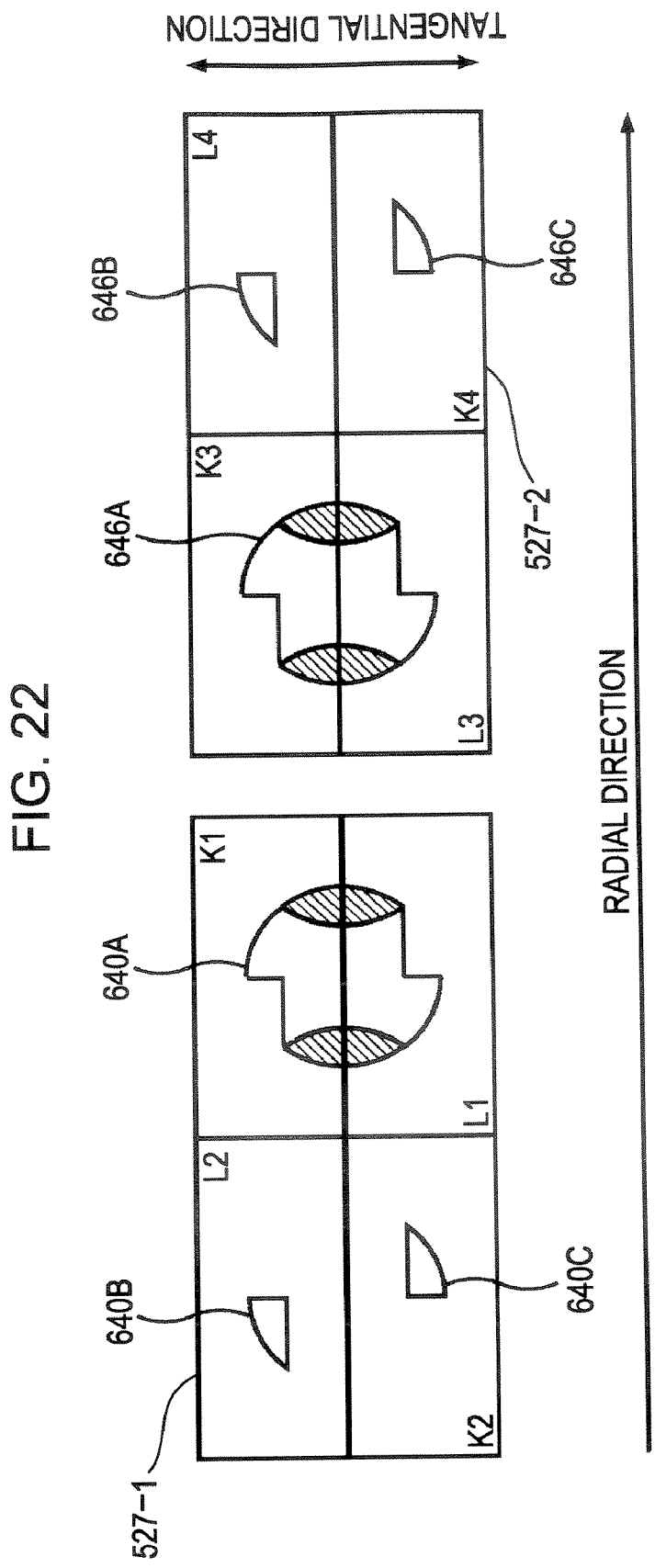
FIG. 22 is a structural view of a light-receiving section of a photodetector provided corresponding to the diffraction grating shown in FIG. 21.

FIG. 22 shows the structure of the light-receiving section of the photodetector 527 disposed in the optical pickup 500 corresponding to the diffraction grating 621 shown in FIG. 21. In this case, it is assumed that the photodetector 527 includes light-receiving portions 527-1 and 527-2.

Referring to FIG. 22, the light-receiving portion 527-1 is divided into four regions K1, K2, L1, and L2. The regions K1 and L2 receive one of ±1-order light beams diffracted by the region 621A of the diffraction grating 621, for example, a spot 640A of ±1-order light. The region K2 receives one of ±1-order light beams diffracted by the region 621C of the diffraction grating 621, for example, a spot 640C of ±1-order light. The region L2 receives one of ±1-order light beams diffracted by the region 621B of the diffraction grating 621, for example, a spot 640B of ±1-order light.

The light-receiving portion 527-2 is divided into four regions K3, K4, L3, and L4. The regions K3 and L3 receive one of the ±1-order light beams diffracted by the region 621A of the diffraction grating 621, for example, a spot 646A of −1-order light. The region K4 receives one of the ±1-order light beams diffracted by the region 621C of the diffraction grating 621, for example, a spot 646C of −1-order light. The region L4 receives one of the ±1-order light beams diffracted by the region 621B of the diffraction grating 621, for example, a spot 646B of −1-order light.

A lens shift signal LS1 is found on the basis of the light beam diffracted by the region 621A of the diffraction grating 621 according to the following expression:

$$LS1=(K1-L1)+(K3-L3)$$

where K1, K2, L1, and L2 represent the values of signals output from the regions K1, K2, L1, and L2 of the light-receiving portion 527-1, and K3, K4, L3, and L4 represent the values of signals output from the regions K3, K4, L3, and L4 of the light-receiving portion 527-2.

A lens shift signal LS2 is found on the basis of the light beams diffracted by the regions 621B and 621C of the diffraction grating 621 according to the following expression:

$$LS2=(K2-L2)+(K4-L4)$$

Then, a lens shift signal LS is finally calculated from these lens shift signals LS1 and LS2 according to the following expression:

$$LS=LS1+LS2$$

By thus finding the lens shift signal LS on the basis of the two lens shift signals LS1 and LS2, the amplitude of the detected lens shift signal LS can be sufficiently increased. As a result, a DC offset contained in a push-pull signal is cancelled on the basis of the lens shift signal by means of calculation similar to that used in the differential push-pull method, and a precise tracking error signal can be detected.

For example, when the regions K1 to K4 and the regions L1 to L4 of the light-receiving portions 527-1 and 527-2 are wired in FIG. 22, signal values K and L may be obtained from the regions according to the following expressions:

$$K=K1+K2+K3+K4$$

$$L=L1+L2+L3+L4$$

A lens shift signal LS may be given by the following expression:

$$LS=K-L$$

That is, instead of converting current values respectively output from the regions K1 to K4 and L1 to L4 into voltage values and calculating a lens shift signal from the voltage values, a lens shift signal may be calculated on the basis of a voltage value converted from a current value output from the four regions K1 and K4, and a voltage value converted from a current value output from the four regions L1 and L4. This can reduce the number of I/V conversion circuits for converting the current value into the voltage value.

Figure 23:
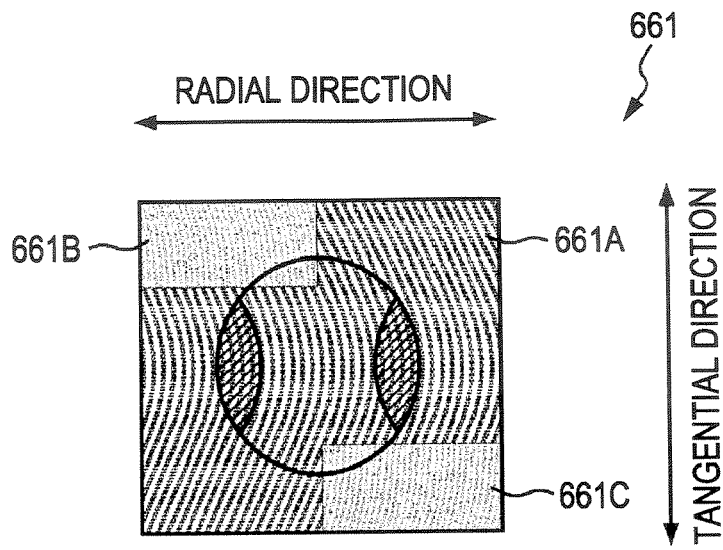
FIG. 23 is a structural view of a modification of the diffraction grating shown in FIG. 18 or 19.

The diffraction grating 621 shown in FIG. 21 may be replaced with a diffraction grating 661 shown in FIG. 23. FIG. 23 also shows the shape of a spot of a light beam passing through the diffraction grating 661. The diffraction grating 661 provides an advantage similar to that of a cylindrical lens, and enlarges the spot of the light beam passing therethrough in the disc tangential direction. This further reduces the size of the light-receiving section of the photodetector.

The diffraction grating 661 is divided into regions 661A to 661C. In this case, ±1-order light beams diffracted by the regions 661A to 661C are received at different positions on the light-receiving section of the photodetector 527.

Figure 24:
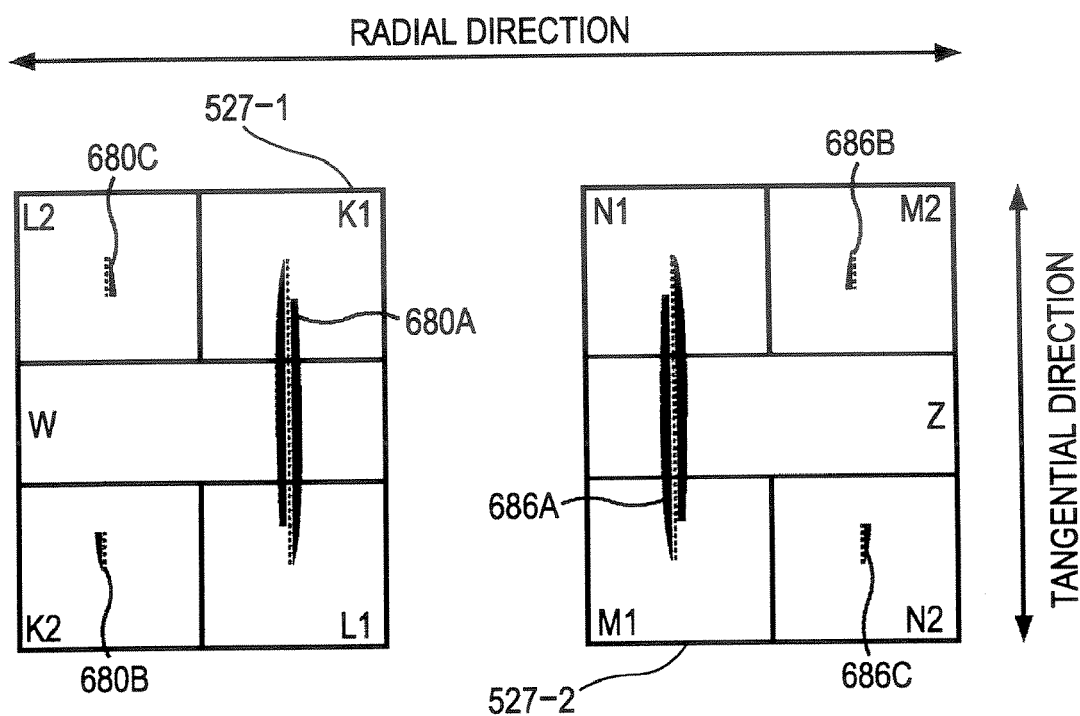
FIG. 24 is a structural view of a light-receiving section of a photodetector provided corresponding to the diffraction grating shown in FIG. 23.

FIG. 24 shows the structure of a light-receiving section of a photodetector 527 provided corresponding to the diffraction grating 661 shown in FIG. 23. The photodetector 527 includes light-receiving portions 527-1 and 527-2.

The light-receiving portion 527-1 shown in FIG. 24 is divided into five regions K1, K2, L1, L2, and W. The regions K1, L1, and W receive one of ±1-order light beams diffracted by the region 661A of the diffraction grating 661, for example, a spot 680A of +1-order light. The region K2 receives one of ±1-order light beams diffracted by the region 661B of the diffraction grating 661, for example, a spot 680B of +1-order light. The region L2 receives one of ±1-order light beams diffracted by the region 661C of the diffraction grating 661, for example, a spot 680C of +1-order light.

The light-receiving portion 527-2 is divided into five regions N1, N2, M1, M2, and Z. The regions M1, N1, and Z receive one of the ±1-order light beams diffracted by the region 661A of the diffraction grating 661, for example, a spot 686A of −1-order light. The region N2 receives one of the ±1-order light beams diffracted by the region 661C of the diffraction grating 661, for example, a spot 686C of −1-order light. The region M2 receives one of the ±1-order light beams diffracted by the region 661B of the diffraction grating 661, for example, a spot 686B of −1-order light.

By means of the above-described effect of the cylindrical lens of the diffraction grating 661, the spots 680A to 680C and the spots 686A to 686C are long only in the tangential direction, and the lengths thereof in the radial direction are substantially zero.

With the structures shown in FIGS. 23 and 24, a focus error signal can be detected by a spot-size detection method, in a manner similar to the case described with reference to FIG. 11. A focus error signal FE is given by the following expression:

$$FE = Z + (K1 + L2) + (K2 + L1) - \{(W + (M1 + N2) + (M2 + N1))\}$$

where K1, K2, L1, L2, and W represent signals output from the regions K1, K2, L1, L2, and W of the light-receiving portion 527-1, and N1, N2, M1, M2, and Z represent signals output from the regions N1, N2, M1, M2, and Z of the light-receiving portion 527-2.

In the case shown in FIG. 11, it is difficult to expect that an obtained focus error signal has a good peak characteristic. The light beam passing through the diffraction grating 381 shown in FIG. 10 forms, on the light-receiving section, the spot 420 that is not circular, but has the chipped portions 420A and 420B (upper left and lower right sides). When the spot is made larger (such as to have a larger radius) by defocusing, the proportion of the chipped portions to the entire spot increases. In contrast, when the spot is made smaller (such as to have a smaller radius), the proportion of the chipped portions to the entire spot decreases. That is, the peak value of the detected focus error signal greatly differs between defocusing to the far side and defocusing to the near side.

In contrast, with the structures shown in FIGS. 23 and 24, the spots 680B, 680C, 686B, and 686C passing through the regions 661B and 661C of the diffraction grating 661 and received by the light-receiving portions are also used to calculate a focus error signal. Therefore, the peak characteristic of the detected focus error signal can be improved further.

In this case, a lens shift signal LS is given by the following expression:

$$LS = (K1 + M1) - (L1 + N1) + (K2 + M2) - (L2 + N2)$$

By wiring the regions K1 and K2, the regions L1 and L2, the regions M1 and M2, and the regions N1 and N2, signals output from the regions can be obtained as values K, L, M, and N according to the following expressions:

$$K = K1 + K2$$

$$L = L1 + L2$$

$$M = M1 + M2$$

$$N = N1 + N2$$

Then, a lens shift signal LS may be calculated by the following expression:

$$LS = (K + M) - (L + N)$$

This can also reduce the number of I/V conversion circuits for converting the current value into the voltage value.

As described above, when the spot of the light beam is moved in the tangential direction by disc tilting, the difference between signals output from the regions arranged in the tangential direction in the light-receiving section is changed by the movement, regardless of the occurrence of lens shifting. This is because the areas of portions of the spot in the regions of the light-receiving section become different. Therefore, disc tilting sometimes produces noise in the lens shift signal.

Figure 25:
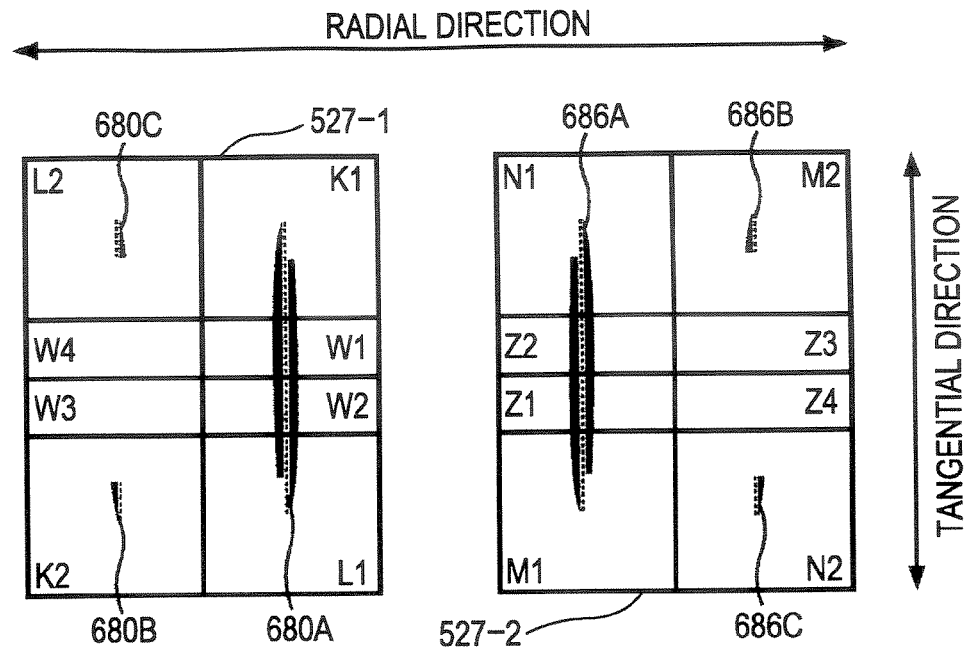
FIG. 25 is a structural view of a modification of the light-receiving section of the photodetector provided corresponding to the diffraction grating shown in FIG. 23.

In order to suppress noise caused in the lens shift signal by the movement of the spot in the tangential direction due to disc tilting, the light-receiving portions 527-1 and 527-2 shown in FIG. 24 may have structures shown in FIG. 25.

In the light-receiving portion 527-1 shown in FIG. 25, the region W in FIG. 24 is divided into four regions W1 to W4. In the light-receiving portion 527-2, the region Z in FIG. 24 is divided into four regions Z1 to Z4.

When the light-receiving portions 527-1 and 527-2 have the structures shown in FIG. 25, a lens shift signal is calculated as follows. First, values A to D are calculated by the following expressions:

$$A = K1 + W1 + k2 + W3$$

$$B = L1 + W2 + L2 + W4$$

$$C = M1 + Z1 + M2 +$$

$$D = N1 + Z2 + N2 + Z4$$

where K1, K2, L1, L2, and W1 to W4 represent signals output from the regions K1, K2, L1, L2, and W1 to W4 of the light-receiving portion 527-1, and N1, N2, M1, M2, and Z1 to Z4 represent signals output from the regions N1, N2, M1, M2, and Z1 to Z4 of the light-receiving portion 527-2.

Then, a lens shift signal LS is given by the following expression:

$$LS = (A + C) - (B + D)$$

In this case, when the spot of the light beam moves in the tangential direction, the lens shift signal can be prevented from being changed by the change of the areas of the portions of the spot formed in the regions due to the movement.

Figure 26:
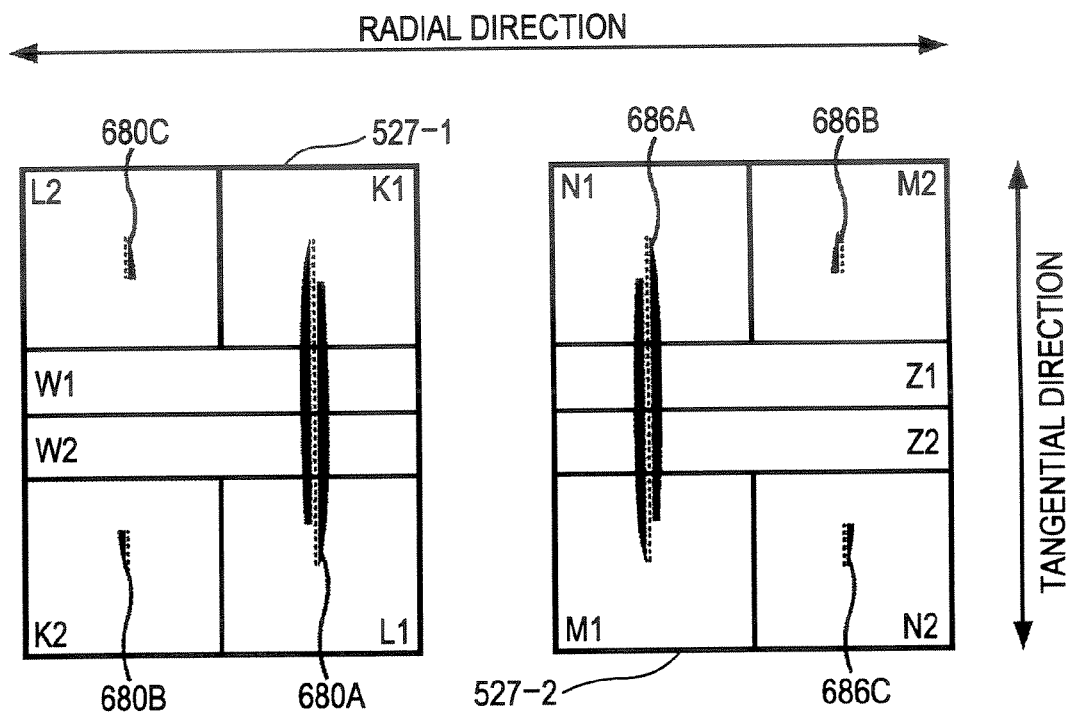
FIG. 26 is a structural view of another modification of the light-receiving section of the photodetector provided corresponding to the diffraction grating shown in FIG. 23.

The structures of the light-receiving portions 527-1 and 527-2 shown in FIG. 25 may be further simplified, as shown in FIG. 26.

In the structures shown in FIG. 26, a lens shift signal is found as follows. That is, values A to D are first calculated as follows:

$$A = K1 + W1 + K2$$

$$B = L1 + W2 + L2$$

$$C = M1 + Z1 + M2$$

$$D = N1 + Z2 + N2$$

Then, a lens shift signal LS is given by the following expression:

$$LS = (A + C) - (B + D)$$

In this case, when the spot of the light beam moves in the tangential direction, the change of the lens shift signal caused by the change in the areas of the portions of the spot formed in the regions of the light-receiving section can be suppressed. Moreover, the structure of the light-receiving section of the photodetector can be further simplified, and the manufacturing cost of the device can be reduced.

Figure 27:
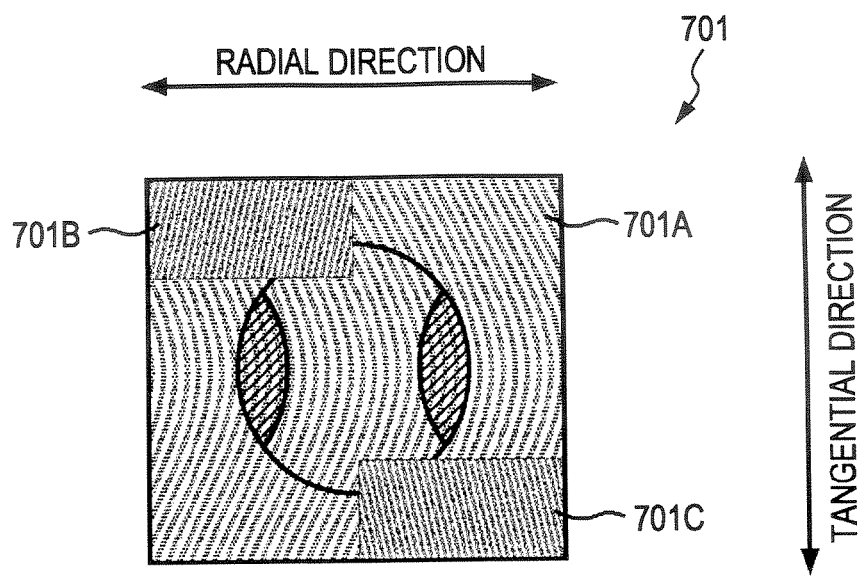
FIG. 27 is a structural view of another modification of the diffraction grating shown in FIG. 18 or 19.

The diffraction grating 661 shown in FIG. 23 may be replaced with a diffraction grating 701 shown in FIG. 27. FIG. 27 also shows the shape of a spot of a light beam passing through the diffraction grating 701. Similarly to the diffraction grating 661, the diffraction grating 701 includes regions 701A to 701C. ±1-order light beams diffracted by the regions 701A to 701C are received at different positions on the light-receiving section of the photodetector 527. However, the positions where the ±1-order light beams are received are different from those in the case using the diffraction grating 661.

The diffraction grating 701 also provides an effect similar to that of a cylindrical lens, and enlarges a spot of a light beam passing through the diffraction grating 701 in the disc tangential direction.

Figure 28:
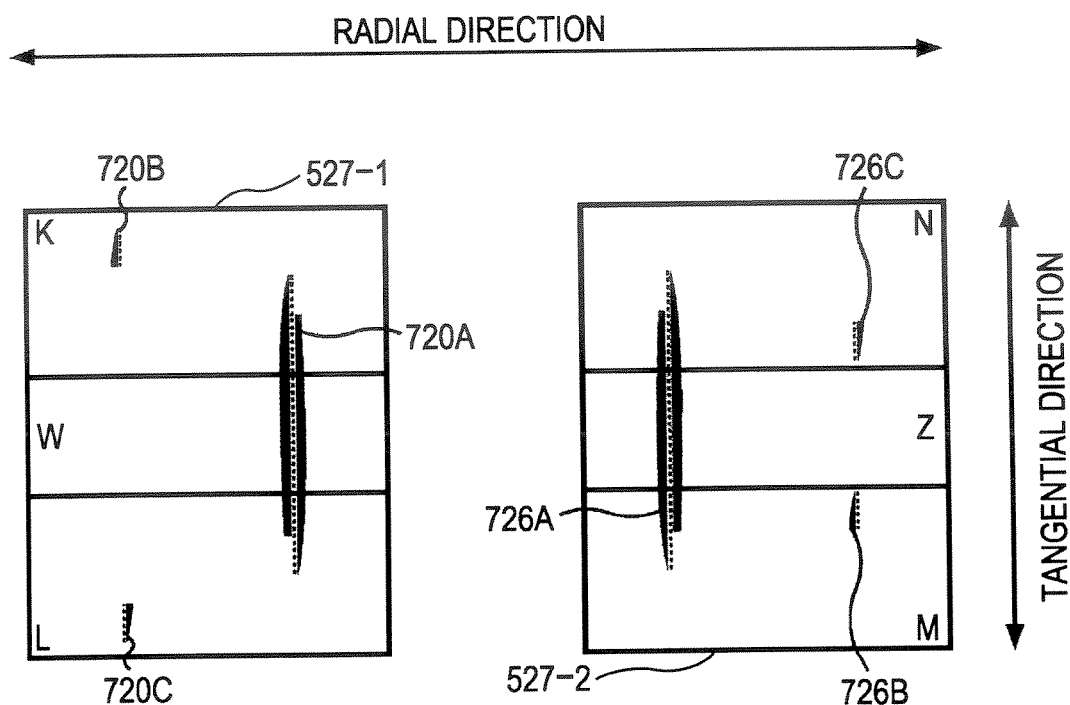
FIG. 28 is a structural view of a light-receiving section of a photodetector provided corresponding to the diffraction grating shown in FIG. 27.

FIG. 28 shows the structure of a light-receiving section of a photodetector 527 provided corresponding to the diffraction grating 701 shown in FIG. 27. The light-receiving section of the photodetector 527 includes light-receiving portions 527-1 and 527-2.

The light-receiving portion 527-1 shown in FIG. 28 is divided into three regions K, L, and W. The regions K, L, and W receive one of ±1-order light beams diffracted by the region 701A of the diffraction grating 701, for example, a spot 720A of +1-order light. The region K receives one of ±1-order light beams diffracted by the region 701B of the diffraction grating 701, for example, a spot 720B of +1-order light. The region L receives one of ±1-order light beams diffracted by the region 701C of the diffraction grating 701, for example, a spot 720C of +1-order light.

The light-receiving portion 527-2 is divided into three regions N, M, and Z. The regions M, N, and Z receive one of the ±1-order light beams diffracted by the region 701A of the diffraction grating 701, for example, a spot 726A of −1-order light. The region N receives one of the ±1-order light beams diffracted by the region 701C of the diffraction grating 701, for example, a spot 726C of −1-order light. The region M receives one of the ±1-order light beams diffracted by the region 701B of the diffraction grating 701, for example, a spot 726B of −1-order light.

A lens shift signal LS is given by the following expression:

$$LS=(K+M)-(L+N)$$

where K, L, and W represent signals output from the regions K, L, and W of the light-receiving portion 527-1, and N, M, and Z represent signals output from the regions N, M, and Z of the light-receiving portion 527-2.

In this way, the structures shown in FIGS. 27 and 28 allow the structure of the photodetector to be simpler than in the cases described with reference to FIGS. 23 to 26.

In the structures shown in FIGS. 27 and 28, however, when the degree of defocusing increases, for example, the spot 720B of +1-order light, of the light beams diffracted by the regions 701B and 701C of the diffraction grating 701 shown in FIG. 27, is sometimes obliquely shifted to the upper left side of the light-receiving portion 527-1, and comes out of the region K, and the spot 720C is sometimes obliquely shifted to the lower left side of the light-receiving portion 527-1, and comes out of the region L. Therefore, when it is expected that the degree of defocusing is high, it is preferable to adopt the structures shown in FIGS. 23 to 26.

While the upper left portion and lower right portions of the diffraction gratings shown in FIGS. 21, 23, and 27 diffract a light beam in a predetermined direction, for example, no light beam may be diffracted by these portions, in a manner similar to that in FIG. 10.

Figure 29:
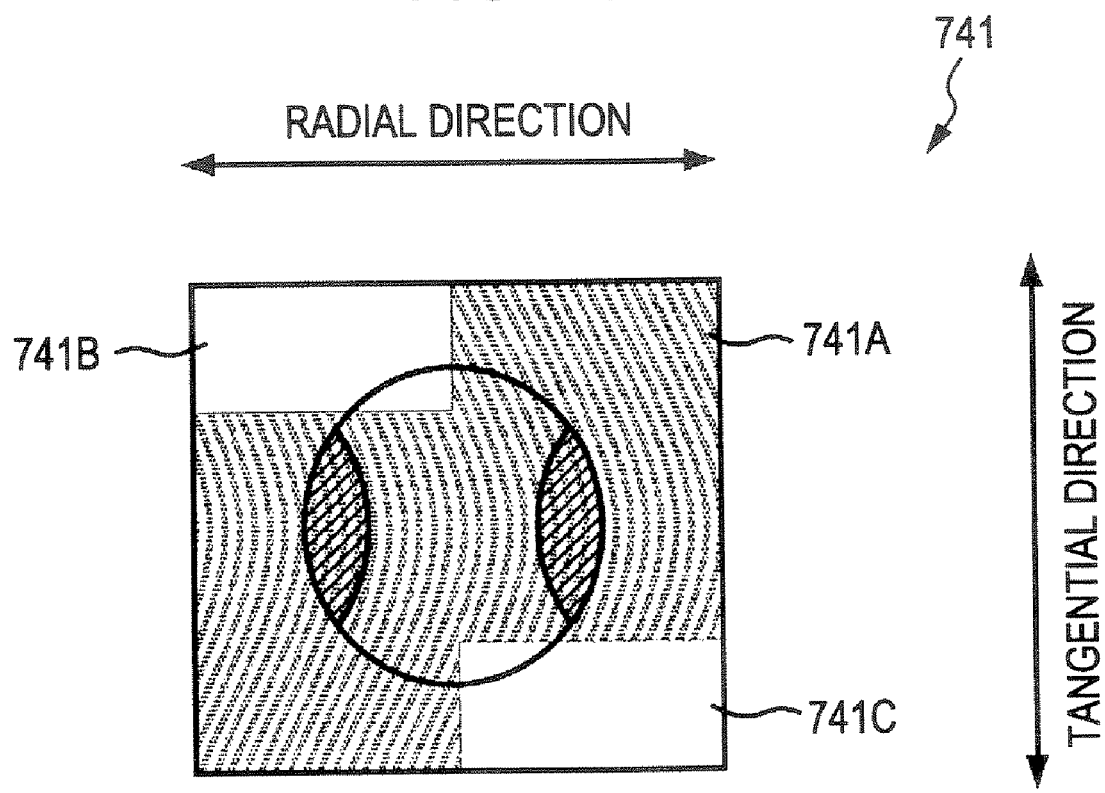
FIG. 29 is a structural view of a further modification of the diffraction grating shown in FIG. 18 or 19.

FIG. 29 shows the structure of a diffraction grating 741 that can be replaced with, for example, the diffraction grating 621 shown in FIG. 21. FIG. 29 also shows the shape of a spot of a light beam passing through the diffraction grating 741. As shown in the figure, the diffraction grating 741 has an upper left region 741B corresponding to the region 621B in FIG. 21, and a lower right region 741C corresponding to the region 621C in FIG. 21. In these regions, a light beam is not diffracted.

FIG. 30 shows the structure of a light-receiving section of a photodetector 527 provided corresponding to the diffraction grating 741 shown in FIG. 29. The light-receiving section includes light-receiving portions 527-1, 527-2, and 527-3.

The light-receiving portion 527-1 shown in FIG. 30 is divided into two regions K1 and L1. The regions K1 and L1 receive one of ±1-order light beams diffracted by the region 741A of the diffraction grating 741, for example, a spot 760A of +1-order light.

The light-receiving portion 527-2 is divided into two regions K3 and L3. The regions K3 and L3 receive one of the ±1-order light beams diffracted by the region 741A of the diffraction grating 741, for example, a spot 766A of −1-order light.

Further, the light-receiving portion 527-3 is divided into two regions K2 and L2. The regions K2 and L2 respectively receive spots 762C and 762B of light beams passing through the regions 741C and 741B of the diffraction grating 741.

A lens shift signal LS1 based on the light beams diffracted by the region 741A of the diffraction grating 741 is given by the following expression:

$$LS1=(K1-L1)+(K3-L3)$$

where K1 to K3 and L1 to L3 represent signals output from the regions K1 to K3 and the regions L1 to L3 of the light-receiving portions 527-1 to 527-3.

A lens shift signal LS2 based on the light beams passing through the regions 741B and 741C of the diffraction grating 741 is given by the following expression:

$$LS2=(K2-L2)$$

A final lens shift signal LS is calculated from these lens shift signals LS1 and LS2 according to the following expression:

$$LS=LS1+LS2$$

By thus finding the lens shift signal LS on the basis of the two lens shift signals LS1 and LS2, the amplitude of the detected lens shift signal LS can be sufficient large. As a result, a DC offset contained in a push-pull signal is cancelled on the basis of the lens shift signal LS by means of calculation similar to that used in the differential push-pull method, and a precise tracking error signal can be detected. Compared with the case shown in FIGS. 21 and 22, the structure of the diffraction grating can be simplified.

While the above-described structures of the diffraction grating and the light-receiving section shown in FIGS. 20 to 30 are applied to the optical pickup 100 shown in FIG. 2 or the optical pickup 500 shown in FIGS. 18 and 19, they may be, of course, applied to an optical pickup using an integrated optical device, as in the optical pickup 300 shown in FIG. 9.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup for recording or reproducing an information signal in an optical disc, comprising:
   a light source for emitting a light beam toward the optical disc;
   an objective lens for focusing the light beam emitted from the light source onto a recording surface of the optical disc; and
   a photodetector for receiving the light beam reflected by the recording surface of the optical disc and outputting a signal corresponding to an intensity of the received light beam,
   wherein an area of a spot of the light beam received by the photodetector is asymmetric in both a radial direction and a tangential direction of the optical disc due to blocking of a portion of the light beam before the light beam reaches the photodetector, and wherein a lens shift signal for the objective lens is detected by a controller on the basis of the signal output from the photodetector, the controller controlling the objective lens to follow the optical disc.

2. The optical pickup according to claim 1, wherein the photodetector has a light-receiving section including a plurality of rectangular regions that are arranged in the tangential direction of the optical disc, and wherein the lens shift signal is detected by a predetermined calculating operation of signals output from the photodetector corresponding to intensities of components of the light beam received by the regions.

3. The optical pickup according to claim 2, wherein the regions of the light-receiving section include at least three regions arranged in the tangential direction of the optical disc, and wherein a focus error signal is detected by another predetermined calculating operation of signals output corresponding to intensities of components of the light beam received by the at least three regions.

4. The optical pickup according to claim 1, further comprising:
   a shielding plate disposed in an optical path along which the light beam travels from the optical disc toward the photodetector, the shielding plate blocking a part of the light beam so that the spot of the light beam is asymmetric in the radial and tangential directions of the optical disc.

5. The optical pickup according to claim 1, further comprising:
   a diffraction grating disposed in an optical path along which the light beam travels from the optical disc toward the photodetector, the shielding plate diffracting a first part of the light beam so that the spot of the light beam is asymmetric in the radial and tangential directions of the optical disc.

6. The optical pickup according to claim 5, wherein a second part of the light beam is not diffracted by the diffraction grating, and is also received by the photodetector along with the first part of the light beam diffracted by the diffraction grating, and wherein the lens shift signal is detected on the basis of signals corresponding to intensities of the first and second parts received by the photodetector.

7. The optical pickup according to claim 5, wherein the diffraction grating has at least two regions for diffracting the first part of the light beam so that the spot of the light beam is asymmetric in the radial and tangential directions of the optical disc, wherein the photodetector receives components of the first part of the light beam diffracted by the at least two regions, and wherein the lens shift signal is detected on the basis of signals corresponding to intensities of the components of the first part of the light beam.

8. The optical pickup according to claim 1, wherein the photodetector has a light-receiving section for receiving the light beam, the light-receiving section being asymmetric in the radial and tangential directions of the optical disc.

9. The optical pickup according to claim 8, wherein the light-receiving section includes at least two regions that are asymmetric in the radial and tangential directions of the optical disc, and wherein the lens shift signal is detected on the basis of signals corresponding to intensities of components of the light beam received by the at least two regions.

10. The optical pickup according to claim 9, wherein predetermined regions among the at least two regions of the light-receiving section are wired, and the sum of currents corresponding to intensities of the components received by the wired predetermined regions are converted into a voltage value serving as a signal corresponding to the intensity of the light beam.

11. The optical pickup according to claim 1, wherein the photodetector has a light-receiving section including a plurality of rectangular regions that are arranged in the tangential direction and the radial direction of the optical disc, wherein the lens shift signal is detected by a predetermined calculating operation of signals output from the photodetector corresponding to intensities of components of the light beam received by the regions, wherein a push-pull signal is detected by another predetermined calculating operation of the signals output corresponding to the intensities of the components of the light beam, and wherein a tracking error signal is detected on the basis of the lens shift signal and the push-pull signal.

12. The optical pickup according to claim 1, further comprising:
   a beam splitter disposed in an optical path along which the light beam travels from the optical disc toward the photodetector, the beam splitter splitting the light beam into a first light beam and a second light beam, wherein the photodetector has a first light-receiving section and a second light-receiving section, and wherein the first light beam is received by the first light-receiving section, and the second light beam is received by the second light-receiving section.

13. The optical pickup according to claim 12, wherein the first light-receiving section includes a plurality of first rectangular regions arranged in the tangential direction of the optical disc, and the second light-receiving section includes a plurality of second rectangular regions arranged in the radial direction of the optical disc.

14. The optical pickup according to claim 13, wherein the first rectangular regions include at least three regions arranged in the tangential direction of the optical disc, the lens shift signal is detected by a predetermined calculating operation of signals output corresponding to intensities of components of the first light beam received by the at least three regions, and a focus error signal is detected by another predetermined calculating operation of the signals, wherein a push-pull signal is detected by a further predetermined calculating operation of signals output corresponding to intensities of components of the second light beam received by the regions of the second light-receiving section, and wherein a tracking error signal is detected on the basis of the lens shift signal and the push-pull signal.

15. The optical pickup according to claim 14, wherein the second rectangular regions include a plurality of rectangular regions arranged in the tangential and radial directions of the optical disc, and wherein a signal corresponding to movement of the objective lens in the tangential direction of the optical disc is detected by a still further predetermined calculating operation of the signals output corresponding to the intensities of the components of the second light beam received by the regions of the second light-receiving section.

16. An optical disc apparatus for recording or reproducing an information signal in an optical disc, the apparatus comprising:

a light source for emitting a light beam toward the optical disc;

an objective lens for focusing the light beam emitted from the light source onto a recording surface of the optical disc;

a photodetector for receiving the light beam reflected by the recording surface of the optical disc and outputting a signal corresponding to an intensity of a spot of the received light beam; and a controller for controlling the objective lens to follow the optical disc by detecting a lens shift signal for the objective lens on the basis of the signal output from the photodetector, wherein an area of the spot of the light beam received by the photodetector is asymmetric in both a radial direction and a tangential direction of the optical disc due to blocking of a portion of the light beam before the light beam reaches the photodetector.

* * * * *